(12) United States Patent
Ho et al.

(10) Patent No.: US 8,201,268 B1
(45) Date of Patent: Jun. 12, 2012

(54) INTEGRATED HIGH INDEX CONTRAST SUB-WAVELENGTH OPTICAL TRANSFORMING TIP (HICSWOTT) FOR NEAR-FIELD SCANNING OPTICAL MICROSCOPE

(75) Inventors: Seng-Tiong Ho, Wheeling, IL (US); Yingyan Huang, Wilmette, IL (US)

(73) Assignee: Optonet Inc., Evanston, IL (US)

( * ) Notice: Subject to any disclaimer, the term of this patent is extended or adjusted under 35 U.S.C. 154(b) by 353 days.

(21) Appl. No.: 12/590,685

(22) Filed: Nov. 12, 2009

Related U.S. Application Data

(60) Provisional application No. 61/199,116, filed on Nov. 13, 2008.

(51) Int. Cl.
*H01J 3/14* (2006.01)
*C03C 15/00* (2006.01)

(52) U.S. Cl. ............... 850/59; 850/52; 850/55; 850/56; 850/57

(58) Field of Classification Search .............. 250/21, 250/52, 55, 56, 57, 59
See application file for complete search history.

(56) References Cited

U.S. PATENT DOCUMENTS

| | | | | |
|---|---|---|---|---|
| 4,206,967 A * | 6/1980 | Onoda et al. | ............ | 385/127 |
| 5,272,330 A * | 12/1993 | Betzig et al. | ............ | 250/216 |
| 5,389,779 A * | 2/1995 | Betzig et al. | ............ | 250/216 |
| 5,410,151 A * | 4/1995 | Buckland | ............ | 250/227.26 |
| 5,812,724 A * | 9/1998 | Ohtsu et al. | ............ | 385/128 |
| 5,908,562 A * | 6/1999 | Ohtsu et al. | ............ | 216/11 |
| 7,065,274 B2 * | 6/2006 | Miller | ............ | 385/43 |
| 7,187,816 B2 * | 3/2007 | Huang | ............ | 385/12 |
| 7,519,257 B2 * | 4/2009 | Lipson et al. | ............ | 385/126 |
| 7,649,166 B2 * | 1/2010 | Liu et al. | ............ | 250/208.1 |
| 7,835,102 B2 * | 11/2010 | Takayama et al. | ............ | 360/59 |
| 8,014,101 B2 * | 9/2011 | Shimazawa et al. | ............ | 360/125.31 |
| 8,030,604 B2 * | 10/2011 | Mimouni et al. | ............ | 250/201.9 |
| 8,063,383 B2 * | 11/2011 | Pryadkin et al. | ............ | 250/442.11 |
| 2005/0232544 A1 * | 10/2005 | Blumberg | ............ | 385/43 |
| 2005/0265659 A1 * | 12/2005 | Miller | ............ | 385/43 |
| 2006/0126991 A1 * | 6/2006 | Huang | ............ | 385/12 |
| 2006/0228074 A1 * | 10/2006 | Lipson et al. | ............ | 385/42 |
| 2009/0133170 A1 * | 5/2009 | Rolland et al. | ............ | 850/56 |
| 2009/0134025 A1 * | 5/2009 | Shtein et al. | ............ | 204/407 |
| 2009/0205090 A1 * | 8/2009 | Mimouni et al. | ............ | 850/30 |
| 2009/0276923 A1 * | 11/2009 | Sumetsky | ............ | 850/32 |
| 2010/0017922 A1 * | 1/2010 | Shin et al. | ............ | 850/21 |
| 2010/0064396 A1 * | 3/2010 | Nakata et al. | ............ | 850/30 |
| 2010/0135615 A1 * | 6/2010 | Ho et al. | ............ | 385/33 |
| 2010/0141939 A1 * | 6/2010 | Zhan | ............ | 356/301 |
| 2010/0207039 A1 * | 8/2010 | Ulcinas et al. | ............ | 250/492.1 |
| 2010/0218287 A1 * | 8/2010 | Nakata et al. | ............ | 850/6 |
| 2011/0296562 A1 * | 12/2011 | Beaurepaire et al. | ............ | 850/21 |
| 2011/0321204 A1 * | 12/2011 | Karaki et al. | ............ | 850/32 |

* cited by examiner

*Primary Examiner* — David A Vanore

(74) *Attorney, Agent, or Firm* — William L. Botjer

(57) ABSTRACT

An optical tip for a Near-field Scanning Optical Microscope (NSOM) is provided. The optical tip includes a waveguide with a semiconductor or metal core and a cladding. The refractive-index-square-ratio contrast between the core and the cladding is at least 0.3. The optical tip may also include a light detector and a light source. The waveguide, the light source and the light detector may be integrated to form a single chip.

23 Claims, 18 Drawing Sheets

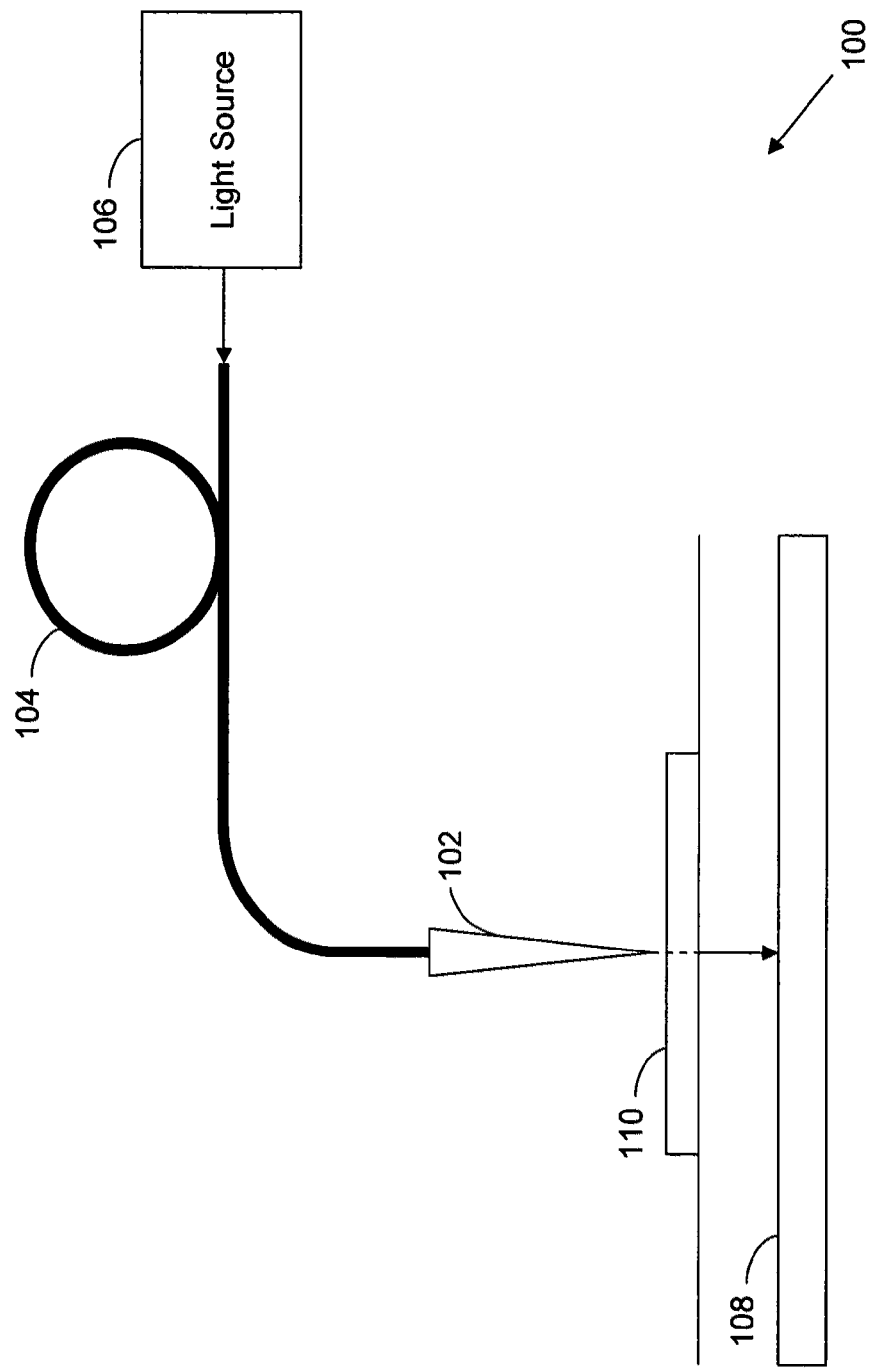

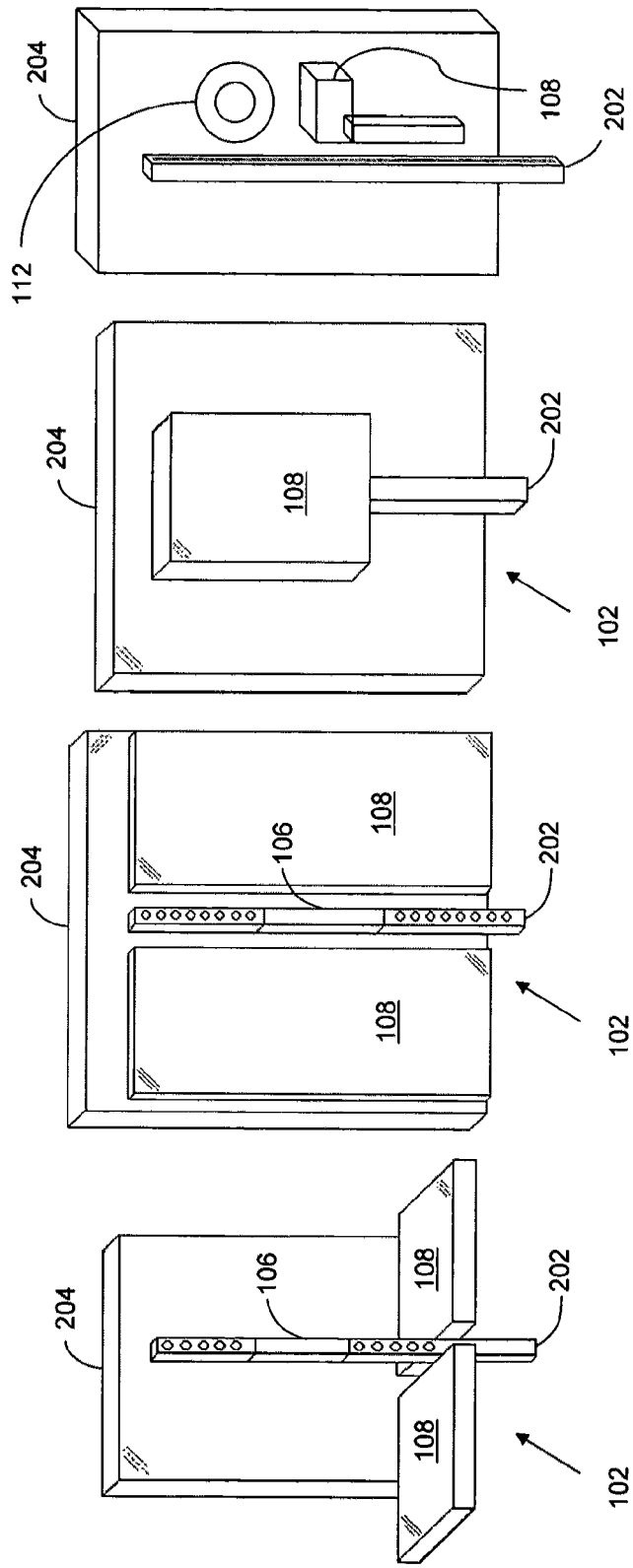

INTEGRATED HIGH INDEX CONTRAST SUB-WAVELENGTH OPTICAL TRANSFORMING TIP (HICSWOTT) FOR NEAR-FIELD SCANNING OPTICAL MICROSCOPE

REFERENCE TO RELATED APPLICATION

This application claims the priority of U.S. provisional patent application Ser. No. 61/199,116, filed Nov. 13, 2008, titled, 'INTEGRATED HIGH INDEX CONTRAST SUB-WAVELENGTH OPTICAL TRANSFORMING TIP (HICSWOTT) FOR NEAR-FIELD SCANNING OPTICAL MICROSCOPE', the contents of which are herein incorporated by reference.

FIELD OF THE INVENTION

This invention relates generally to the field of Near-field Scanning Optical Microscopy and more specifically to a near-field optical tip for use in a Near-field Scanning Optical Microscope (NSOM) and other related instruments.

BACKGROUND OF THE INVENTION

An NSOM is a type of microscope that is used to image objects of different sizes in a sub-wavelength region of light with resolution greater than those achievable by conventional optical microscope. It is well known to those skilled in the art that the minimum resolution of conventional optical microscope is limited by the diffraction limit, expressed as $d=0.61\lambda/NA$, where $\lambda$ is the vacuum wavelength; NA is the numerical aperture of the optical component (usually 1.3-1.4 for modern objectives). Therefore, the resolution limit for conventional optical microscopy is usually around $\lambda/2$. The diffraction limit assumes that the light is diffracted into the far-field that propagates without any restrictions, in comparison, an NSOM makes use of evanescent or non propagating fields that exist only near the surface of the object. As a result, the NSOM can obtain resolutions that are better than those obtained by using conventional optical microscopes. To work in the near field region, NSOM requires a small source of light placed close to the sample to be scanned. A source of light having a diameter much smaller than the wavelength of light is used. Further, the distance between the sample and the microscope tip is kept much less than the wavelength of light.

Applications of NSOMs include, but are not limited to, single-molecule spectroscopy, Raman spectroscopy, data storage, high-speed imaging, and experiments using measuring instruments in the fields of nanotechnology, biotechnology, optical technology, meso-scopic physics, chemistry, etc.

It is known to those skilled in the art that the typical NSOM tip is formed by coating the tip of an optical fiber with metal. Typically, the optical tip of an NSOM has two components: a core and a cladding. The core is usually made of an optical fiber. The cladding, which surrounds the core, is usually a metal such as aluminum. The sample is illuminated by directing a beam of light through the core of the optical tip. For example, a laser source is used to illuminate the sample. The light passing through the sample is collected and detected. Alternatively, the light reflected from the sample is collected and detected. The sample can also be scanned by illuminating it with an external source of light, then collecting and detecting the reflected or transmitted light through the optical tip.

When the sample is illuminated by directing a beam of light through the core of the optical tip, the amount of energy transmitted from the light source to the optical tip is referred to as the throughput of the NSOM. The throughput of NSOM can also be described as the percentage of light reflected from the sample surface and collected by the optical tip, which can be transmitted to the other end of the optical fiber for detection purpose. In current NSOMs, there is a large loss of light energy inside the optical tip due to the design of the optical tip. Most of the optical energy provided through laser source is absorbed inside the optical tip. As a result, the throughput of the NSOM is very low. For example, in an NSOM application with an optical tip aperture of 50-200 nm, the wavelength of light used is 400-500 nm, light throughput is around $10^{-1}$ to $10^{-4}$ percent.

FIG. 1A illustrates a Near-field Scanning Optical Microscope (NSOM) 100 set-up in the transmission mode of imaging, in accordance with various embodiments of the invention. NSOM 100 is a microscope that is used for imaging objects of various sizes in the sub-wavelength region of light. NSOM 100 comprises an optical tip 102, an optical fiber 104, a light source 106 and a light detector 108. Light-source 106 generates a beam of light. Light-source 106 is a 'Light Amplification by Stimulated Emission of Radiation' (LASER) source. The beam of light is passed through optical fiber 104 to optical tip 102.

A sample 110 that is to be scanned is placed under optical tip 102. Sample 110 is illuminated by the beam of light directed by optical tip 102. This beam of light is transmitted through sample 110 and is collected and detected at light detector 108. The collected light contains optical information pertaining to sample 110. Thereafter, the optical information is analyzed.

The collection and detection of the light passing through sample 110 by transmitting the light through sample 110 is referred to as 'transmission mode imaging'. The optical information can also be collected by other modes of imaging such as the reflection mode, the collection mode or the illumination-collection mode.

NSOM 100 can work in the reflection mode of imaging as shown in FIG. 1B. In the reflection mode of imaging, sample 110 is illuminated by using a beam of light coming through optical tip 102. The light reflected from sample 110 is collected and detected at light detector 108 that is placed about sample 110. In this mode, optical tip 102 is only used to illuminate sample 110, and the light reflected from sample 110 is collected at light detector 108.

NSOM 100 can also work in the collection mode of imaging as shown in FIG. 1C, whereby sample 110 is illuminated by using an external macroscopic light source from above or beneath sample 110. The light reflected from sample 110 is collected at light detector 108 through optical tip 102. In this mode, the external light source is used to illuminate sample 110 and the light reflected from sample 110 is collected by optical tip 102. Thereafter, the optical information is transmitted to light detector 108 through optical tip 102.

NSOM 100 can also work in the illumination-collection imaging mode as shown in FIG. 1D, whereby sample 110 is illuminated by using a beam of light coming through optical tip 102 wherein 105 is an optical beam splitter with light transmissivity and light reflectivity so that light source 106 can be transmitted through beam splitter 105 into the optical fiber 104 and exit tip 102. The light reflected from sample 110 is collected through optical tip 102 and reflected to light detector 108 by beam splitter 105. In this mode, optical tip 102 is used to illuminate sample 110 and also used to transmit the collected light to light detector 108.

Optical tip 102 typically comprises a core and a cladding. The core is surrounded by the cladding to provide optical properties. The core is made of optical fiber. Examples of optical fiber include a glass and a plastic fiber. The material of the cladding includes metal coatings such as aluminum, silver, nickel, Gold, etc. The aperture diameter of optical tip 102 is less than the wavelength of light originating from light source 106. For example, the aperture diameter of optical tip 102 is in the range of 50 nm to 200 nm for a light source of wavelength in the range of 400 nm to 500 nm. Further, the distance between optical tip 102 and sample 110 is maintained as less than the wavelength of light. The aperture diameter of optical tip 102 governs the resolution of the image of the sample, obtained by NSOM 100.

The amount of energy transmitted from light source 106 to optical tip 102 is referred to as the throughput of NSOM 100, which depends on the optical and mechanical properties of the fiber used as the core and the metal used as the cladding. Typically, when a laser with a wavelength in the range of 400 nm to 500 nm is used as light source 106, optical tip 102 with an aperture diameter in the range of 50 nm to 200 nm and length of 10 μm is used to reduce the mode size from 8 micron to 200 nm. Optical tip 102 has a throughput in the range of $10^{-1}$ to $10^{-4}$ percent. For example, for a 532 nm wavelength of light, optical tip 102 typically provides a power output of 10 nW-100 nW for an input of 50 mW.

A high throughput at the optical tip results in faster scanning speeds. By using high-energy lasers in NSOM applications, higher energy can be obtained at the optical tip. However, this causes localized heating at the optical tip, resulting in the cladding getting damaged. Moreover, heating inside the optical tip may result in the degraded performance of NSOM over a period of time. Therefore, high-power lasers are not preferred for achieving higher power at the optical tip.

Metal-coated near-field NSOM probes can be manufactured by using the wafer-processing technique. The throughput can be increased by about one order of magnitude by preferring this technique over traditional NSOM. However, the increase in throughput does not produce the high power required at the optical tip. Additionally, each NSOM probe manufactured needs to be individually inspected for pinholes and other manufacturing defects. As a result, the manufacturing cost of NSOM probes is high. Consequently, large-scale production of NSOM probes is not possible.

In light of the foregoing, there exists a need for a near-field optical tip that minimizes energy loss inside the probe. The optical tip should have a high energy throughput for near-field scanning operations, while localized heating at the probe should be low. Further, the optical tip should enable the NSOM to achieve faster scanning speeds. Additionally, the optical tip should be easily mass-producible, should require minimum inspection during manufacturing, and should be low in cost.

SUMMARY

An object of the invention is to provide a near-field optical tip for a Near-field Scanning Optical Microscope (NSOM).

Another object of the invention is to minimize energy loss in the optical tip.

Another object of the invention is to provide a near-field optical tip that has high energy throughput with low heat generation.

Another object of the invention is to provide an optical tip that enables the NSOM to achieve faster scanning speeds.

Yet another object of the invention is to provide a near-field optical tip that is easily mass-producible, requires minimum inspection during manufacturing, and is low in cost.

Embodiments of the invention provide an optical tip for an NSOM. The optical tip comprises a waveguide with a dielectric core and a cladding. The refractive-index-square-ratio contrast between the dielectric core and the cladding is at least 0.4.

Embodiments of the invention provide an optical tip for an NSOM. The optical tip comprises a waveguide with a dielectric core and a cladding. The dielectric core is made up of semiconductor as a transparent dielectric material with high refractive index.

Embodiments of the invention provide an optical tip for an NSOM. The optical tip comprises a waveguide with a dielectric core and a cladding. The dielectric core is made up of oxides as a transparent dielectric material with high refractive index.

Embodiments of the invention provide an optical tip for an NSOM. The optical tip comprises a waveguide with a dielectric core and a cladding. The dielectric core is made up of nitride, oxide, carbide, boride, or fluoride as a transparent dielectric material with high refractive index.

Embodiments of the invention provide an optical tip for an NSOM. The optical tip comprises a waveguide with a metal cladding and a dielectric core.

Embodiments of the invention provide an optical tip for an NSOM. The optical tip comprises a waveguide with a dielectric cladding and a metal core.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which:

FIG. 1A illustrates a Near-field Scanning Optical Microscope (NSOM) set-up in the transmission mode of imaging, in accordance with various embodiments of the invention;

FIG. 4A illustrates an optical tip of an NSOM, in accordance with an embodiment of the invention;

FIG. 4B illustrates an optical tip that is integrated in a chip, in accordance with an embodiment of the invention;

FIG. 4C illustrates an optical tip that is integrated in a chip, in accordance with another embodiment of the invention;

FIG. 4D illustrates an optical tip that is integrated in a chip, in accordance with yet another embodiment of the invention;

DESCRIPTION OF EMBODIMENTS

In the current NSOM tip, the sub-wavelength size of the optical field at the tip is generated by the high confinement effect of the metal cladding surrounding the tip of the optical fiber. However, the high confinement of the metal cladding also comes with a high loss of energy. Embodiments of the invention provide a way to generate highly confined optical field without use of high loss metal cladding.

In accordance with an embodiment of the invention, the aperture size for the metal-clad optical tip is in the range of $\lambda/5$ to $\lambda/10$. The tip could be used as an NSOM probing tip serving as a light emitting tip and light detecting tip as well. Therefore, the Near Field Scanning Optical Microscope is referred to as Nano-Waveguide Tip NSOM (NWT-NSOM).

In accordance with another embodiment of the invention, a fully integrated electrically pumped laser is coupled with the NWT-NSOM tip. Further, a laser structure is designed to obtain a relatively high power output in the range of 0.1 to 1 mW at the NWT-NSOM tip. This structure is referred to as Nano-Waveguide-Tip Laser NSOM Chip (NWTL-NSOM chip).

In accordance with yet another embodiment of the invention, in collection mode, a sample is illuminated by using an external light source from above or below the sample. The detecting NSOM probe, used to collect the light from the sample, provides relatively higher detection efficiency. Further, the detecting NSOM probe is integrated with an on chip detector. The integrated chip is referred to as Nano-Waveguide-Tip Detector NSOM Chip (NWTD-NSOM chip).

Figure 1B:
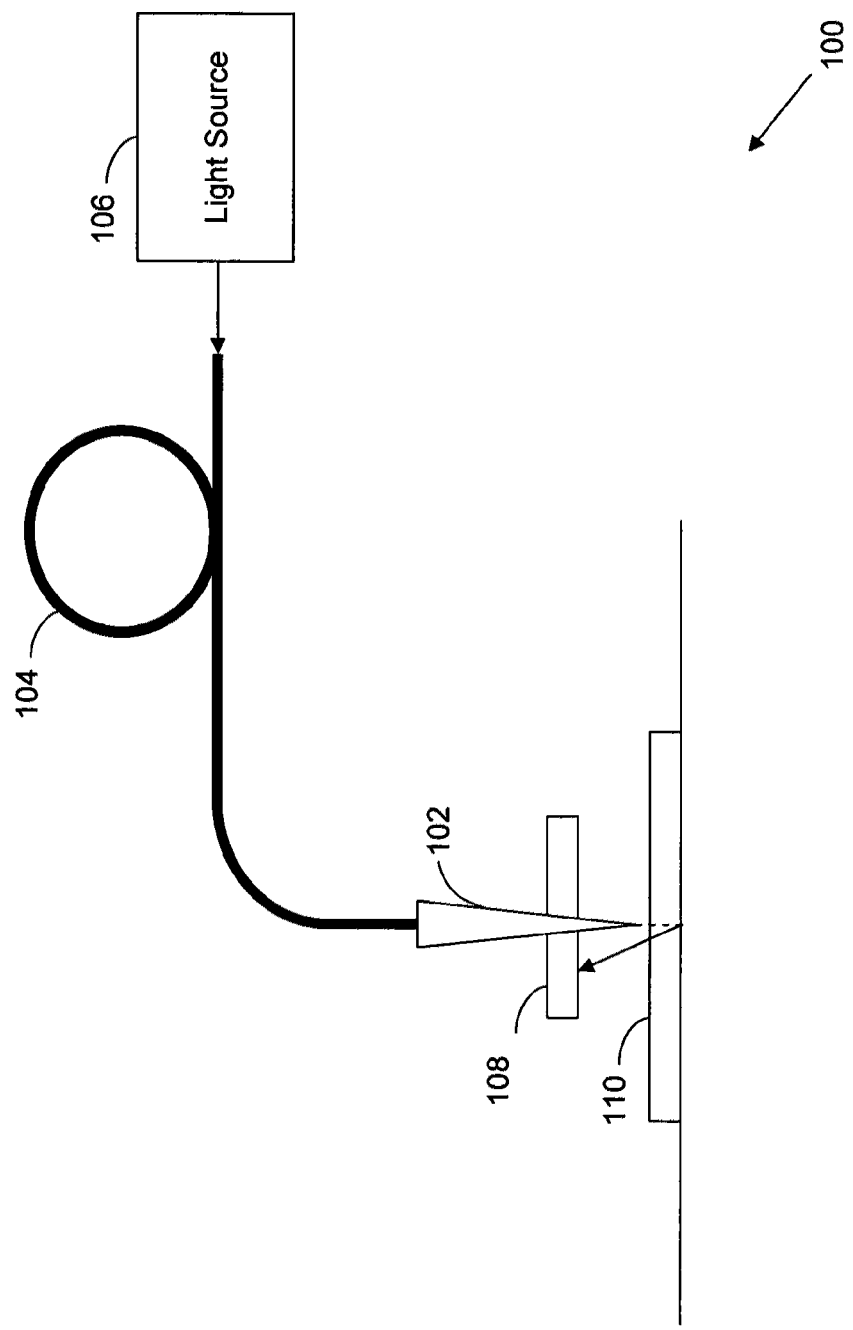
FIG. 1B illustrates a Near-field Scanning Optical Microscope (NSOM) set-up in the reflection mode of imaging, in accordance with various embodiments of the invention.
Figure 1C:
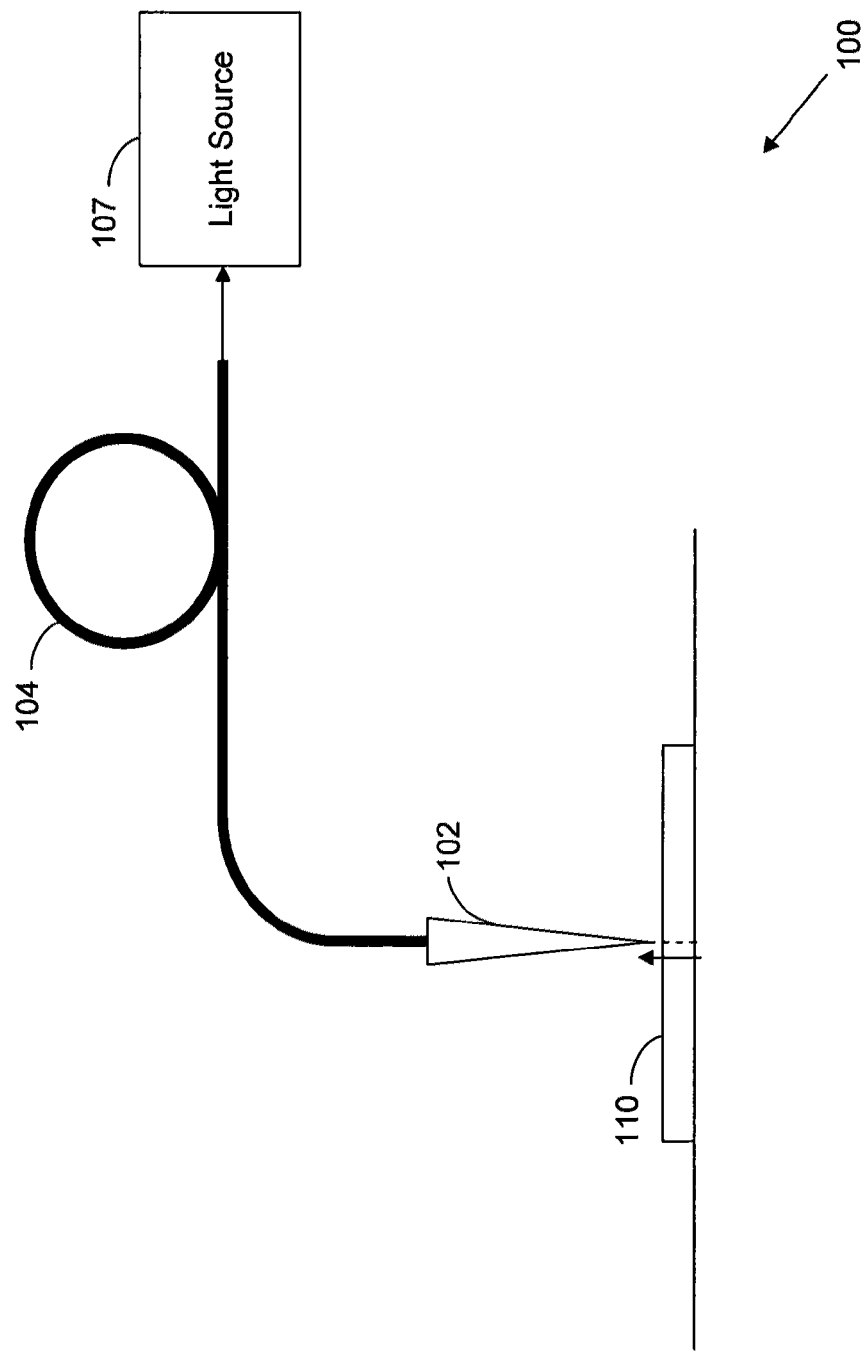
FIG. 1C illustrates a Near-field Scanning Optical Microscope (NSOM) set-up in the collection mode of imaging, in accordance with various embodiments of the invention.
Figure 1D:
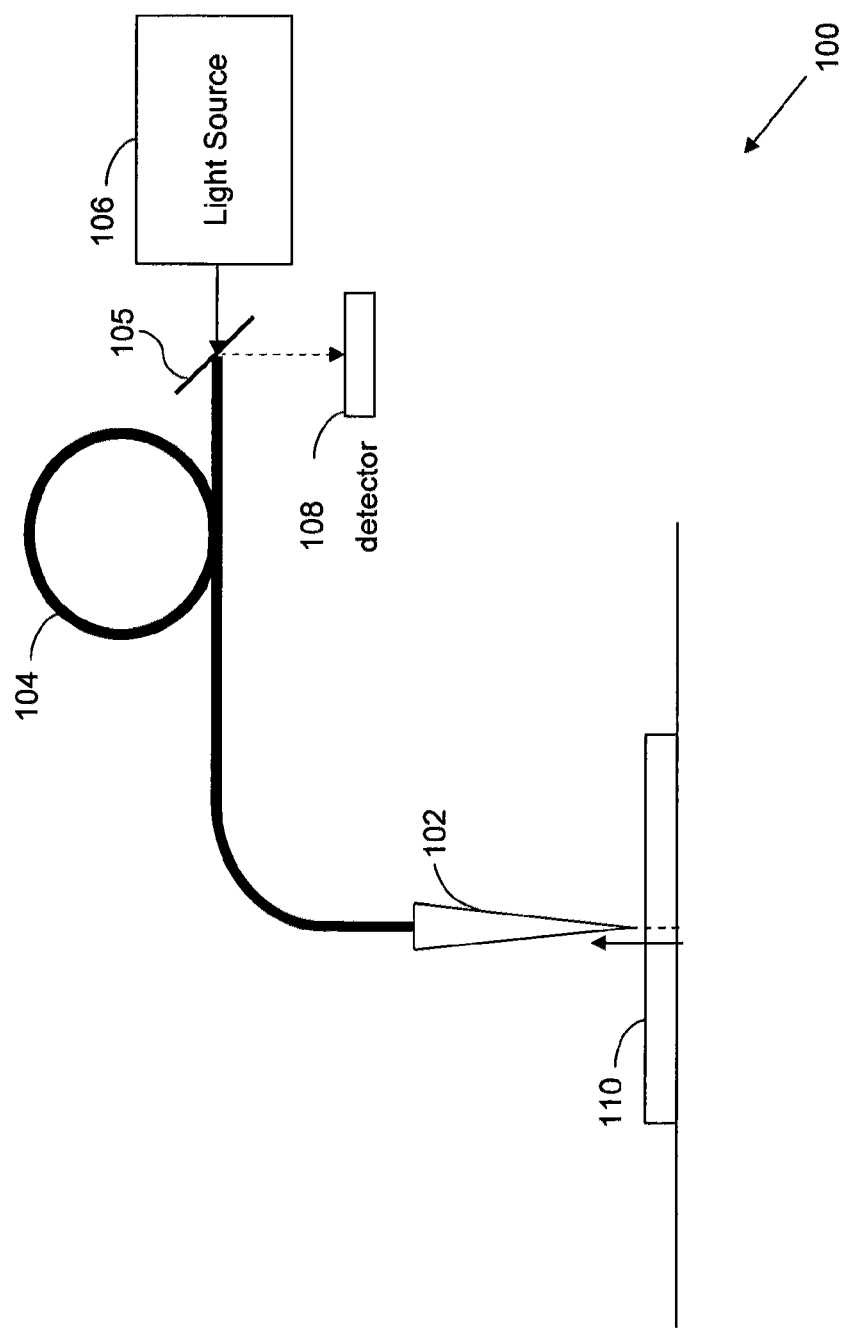
FIG. 1D illustrates a Near-field Scanning Optical Microscope (NSOM) set-up in the illumination-collection mode of imaging, in accordance with various embodiments of the invention.
Figure 2A:
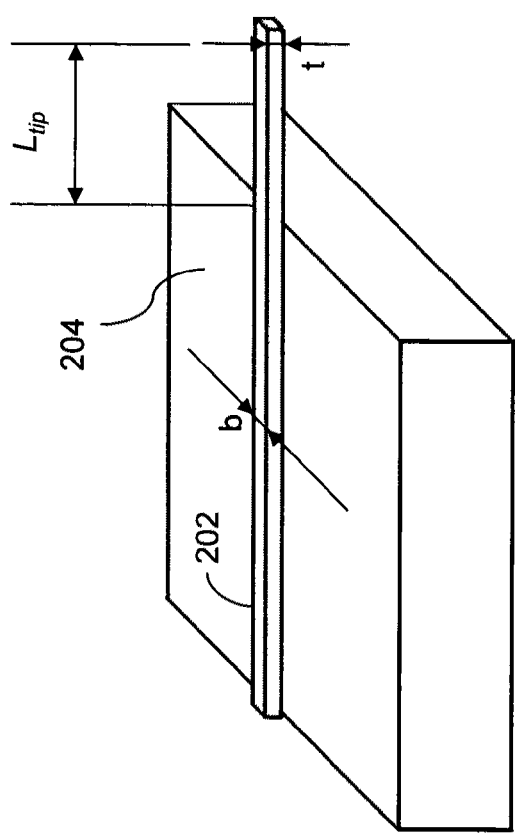
FIG. 2A illustrates an optical waveguide, used in an optical tip of an NSOM, in accordance with an embodiment of the invention.

FIG. 2A illustrates a waveguide 202, for use in NSOM tip 102 of NSOM 100, according to an embodiment of the invention. In an embodiment of the invention, waveguide 202 has a rectangular cross section with a thickness 't' and a width 'b' at the tip. In another embodiment of the invention, waveguide 202 has a circular cross section. In another embodiment, waveguide 202 is fabricated on a substrate 204 in which a section of waveguide 202 hangs beyond the edge of the substrate 204 with a length $L_{tip}$ referred to as the length of the tip for waveguide 202, which can also be called the length of NSOM tip. In another embodiment of the invention, waveguide 202 is made up of dielectric material with high refractive index.

Figure 2B:
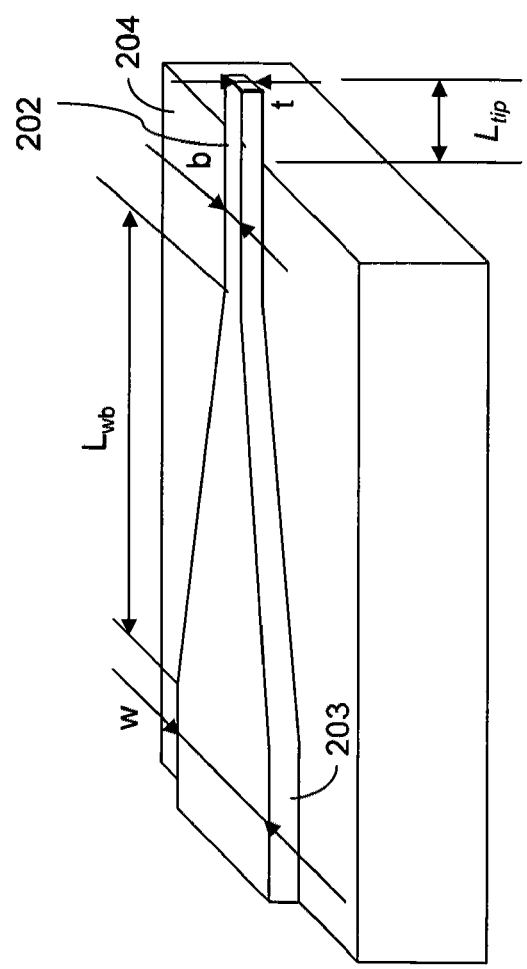
FIG. 2B illustrates an optical waveguide with a tapering down section, used in an optical tip of an NSOM, in accordance with an embodiment of the invention.

In another embodiment of the invention, waveguide 202 is made up of dielectric material with a tapering section with width, tapering down from a width 'w' that is substantially larger than width 'b' as shown in FIG. 2B. This down taper structure helps reduce the mode size in waveguide 202 from a large mode size at the beam input end of waveguide 202 to a small mode size defined by waveguide width 'b' at the tip output end of waveguide 202. As shown in FIG. 2B, this down taper has a length $L_{wb}$.

In another embodiment of the invention, dielectric waveguide 202 is made of a semiconductor material acting as a transparent dielectric material with high refractive index. In another embodiment of the invention, the semiconductor is compound semiconductor, including, but not limited to Indium Phosphide (InP), Gallium Arsenide (GaAs), Indium Gallium Arsenide (InGaAs), Indium Gallium Arsenide Phosphide (InGaAsP), Indium Aluminum Gallium Arsenide (InAlGaAs), Aluminum Arsenide (AlAs), Aluminum Gallium Arsenide (AlGaAs), Indium Gallium Aluminum Phosphide (InGaAlP), Indium Gallium Phosphide (InGaP), Gallium Nitride (GaN), Aluminum Nitride (AlN), Gallium Aluminum Nitride (GaAlN), Gallium Phosphide (GaP), Aluminum Phosphide (AlP) with various compositions of the constituent materials. Other examples of the material of the semiconductor waveguide include semiconductors such as AlSb, GaSb, ZnSe, ZnS, CdS, SiC, SiGe, InGaSb, or InSb and their combinations.

In another embodiment of the invention, the semiconductor is a single-element semiconductor including Silicon and Germanium, As is well known to those skilled in the art, these semiconductor materials have high refractive index typically ranging from n=2 to n=4.

In yet another embodiment of the invention, the dielectric waveguide is oxide, nitride, carbide, boride, or fluoride based material including Titanium Oxide ($TiO_2$), Tantalum pentoxide ($Ta_2O_5$), Zinc Oxide (ZnO), Silicon Oxide ($SiO_2$) Aluminum Oxide ($Al_2O_3$) Indium Oxide ($In_2O_3$), Yttrium Oxide ($Y_2O_3$), Silicon Nitride ($Si_3N_4$), Zirconium Oxide ($ZrO_2$), Niobium Pentoxide ($Nb_2O_5$), Hafnium Oxide ($HfO_2$), Germanium Oxide ($GeO_2$), Lead Oxide (PbO), Silicon Carbide (SiC), Titanium Carbide (TiC), Titanium Nitride (TiN), Chromium Nitride (CrN), Carbon Nitride (CN), Carbon Boride (CB), Barium Fluoride ($BaF_2$), Magnesium Fluoride ($MgF_2$), Diamond like Carbon (DLC). In another embodiment, the dielectric waveguide is a high-refractive-index polymer or organic material such as Benzocyclobutene (BCB), cyclized transparent optical polymer (CYTOP), and a polymer of imide monomers (Polyimide). As is well known to those skilled in the art, the oxides, nitrides and organic materials have high refractive indices of around n=1.6 to n=2.5. These embodiments are for illustration purpose and not limitation.

In an embodiment of the invention, the core of dielectric waveguide 202 is a dielectric material with high refractive index and the air surrounding the core functions as the cladding. As is known to those skilled in the art, the core need not be a single dielectric material but can be a multilayer of dielectric materials or may include multiple compositions of dielectric materials. In an embodiment of the invention, the cladding can be air or other dielectric material as long as the core has on an average high refractive index as compared to that of the cladding.

The refractive index of a substance is defined as a measure of reduction in speed of light, when light passes through the substance. For example, in a substance with a refractive index of 1.5, light travels at 0.67 times its speed in the air. The refractive indices of the core and the cladding govern the propagation of light in optical tip 102. The refractive-index-square-ratio contrast between the core and the cladding can be shown by the following mathematical expression:

$$\text{Refractive-Index-Square-Ratio Contrast} = n_{rc}^2 = \left|\frac{n_1^2 - n_2^2}{2n_1^2}\right|$$

Where $n_1$ is the refractive index of the core, $n_2$ is the refractive index of the cladding, and the vertical bars represent taking the absolute value; $n_{rc}^2$ is the refractive-index-square-ratio contrast and is always positive.

A high refractive-index-square-ratio contrast between the core and the cladding in optical tip 102 produces a small mode size and a confined mode shape. The diameter of the spot of light obtained at sample 110 is referred to as the mode size of NSOM 100. However, the spot of light obtained at the sample is not focused in all the cases. A 'confined mode shape' is distinct, sharp and restricted shape of the spot at the sample. A refractive-index-square-ratio contrast that is greater than approximately 0.3 generates a small mode size and a confined mode shape.

The refractive index of a compound semiconductor is in the range of 2 to 4 and that of air is nearly equal to 1. Therefore, when a compound semiconductor is used as the core and air as the cladding, the following refractive-index-square-ratio contrast values can be obtained:

Refractive-index-square-ratio contrast=0.26, for $n_1$=1.45 and $n_2$=1

Refractive-index-square-ratio contrast=0.28, for $n_1$=1.5 and $n_2$=1

Refractive-index-square-ratio contrast=0.3, for $n_1$=1.55 and $n_2$=1

Refractive-index-square-ratio contrast=0.35, for $n_1$=1.8 and $n_2$=1

Refractive-index-square-ratio contrast=0.38, for $n_1$=2 and $n_2$=1

Refractive-index-square-ratio contrast=0.4, for $n_1$=2.2 and $n_2$=1

Refractive-index-square-ratio contrast=0.42, for $n_1$=2.5 and $n_2$=1

Refractive-index-square-ratio contrast=0.44, for $n_1$=3 and $n_2$=1

Refractive-index-square-ratio contrast=0.46, for $n_1$=3.5 and $n_2$=1

Refractive-index-square-ratio contrast=0.47, for $n_1$=4.0 and $n_2$=1

Moreover, using high-refractive-index dielectric as a material for the waveguide core can make the physical size of the waveguide smaller than $\lambda/(2 n_{diff})$, where $\lambda$ is the wavelength of light in vacuum used, and $$n_{diff} = \sqrt{n_1^2 - n_2^2},$$

where $n_{diff}$ is called the mode-confinement refractive index difference. The full-width half-maximum mode size $d_{mode}$ can be expressed relative to the optical wavelength as $d_{mode}=\lambda/N$. Typically is approximately $2 \times n_{diff}$ or smaller. For example, for $n_1$=3.5 and $\lambda$=512 nm, the physical size of dielectric waveguide 202 can be made smaller than 74 nm. In order to obtain small spot size of around or smaller than $\lambda/N$, where N>2, large refractive-index-square-ratio contrast $n_{rc}^2$ or large $n_{diff}$ is desirable. The relation between refractive-index-square-ratio contrast $n_{rc}^2$ and $2 \times n_{diff}$ is shown below:

Refractive-index-square-ratio contrast=0.26 for $2 \times n_{diff}$=2.1 ($n_1$=1.45, $n_2$=1)

Refractive-index-square-ratio contrast=0.28 for $2 \times n_{diff}$=2.23 ($n_1$=1.5, $n_2$=1)

Refractive-index-square-ratio contrast=0.3 for $2 \times n_{diff}$=2.35 ($n_1$=1.55, $n_2$=1)

Refractive-index-square-ratio contrast=0.35 for $2 \times n_{diff}$=3 ($n_1$=1.8, $n_2$=1)

Refractive-index-square-ratio contrast=0.38 for $2 \times n_{diff}$=3.46 ($n_1$=2.0, $n_2$ Refractive-index-square-ratio contrast=0.4 for $2 \times n_{diff}$=3.92 ($n_1$=2.2, $n_2$=1)

Refractive-index-square-ratio contrast=0.42 for $2 \times n_{diff}$=4.6 ($n_1$=2.5, $n_2$=1)

Refractive-index-square-ratio contrast=0.44 for $2 \times n_{diff}$=5.7 ($n_1$=3.0, $n_2$=1)

Refractive-index-square-ratio contrast=0.46 for $2 \times n_{diff}$=6.7 ($n_1$=3.5, $n_2$=1)

Refractive-index-square-ratio contrast=0.47 for $2 \times n_{diff}$=7.8 ($n_1$=4.0, $n_2$=1)

In order to obtain small spot size of around or smaller than $\lambda/2.3$, large refractive-index-square-ratio contrast $n_{rc}^2$ of larger than about 0.3 is desirable ($n_{rc}^2$>0.3). Somewhat equivalently, in terms of mode-confinement refractive index difference, to obtain small spot size of around or smaller than $\lambda/2.3$, large mode-confinement refractive index difference $n_{diff}$ of larger than about 1.2 is desirable ($n_{diff}$>1.2).

In order to obtain even smaller spot size of around or smaller than $\lambda/3$, large refractive-index-square-ratio contrast $n_{rc}^2$ of larger than about 0.3 is desirable ($n_{rc}^2$>0.3). Somewhat equivalently, in terms of mode-confinement refractive index difference, to obtain a small spot size of around or smaller than $\lambda/3$, a large mode-confinement refractive index difference $n_{diff}$ of larger than about 1.5 is desirable ($n_{diff}$>1.5).

In order to obtain even smaller spot size of around or smaller than $\lambda/4$, a large refractive-index-square-ratio contrast $n_{rc}^2$ of larger than about 0.4 is desirable ($n_{rc}^2$>0.4). Somewhat equivalently, in terms of mode-confinement refractive index difference, to obtain a small spot size of around or smaller than $\lambda/4$, large mode-confinement refractive index difference $n_{diff}$ of larger than about 2.0 is desirable ($n_{diff}$>2.0).

In order to obtain an even smaller spot size of around or smaller than $\lambda/6$, a large refractive-index-square-ratio contrast $n_{rc}^2$ of larger than about 0.44 is desirable ($n_{rc}^2$>0.44). Somewhat equivalently, in terms of mode-confinement refractive index difference, to obtain a small spot size of around or smaller than $\lambda/6$, large mode-confinement refractive index difference $n_{diff}$ of larger than about 3.0 is desirable ($n_{diff}$>3.0).

In order to obtain an even smaller spot size of around or smaller than $\lambda/8$, a large refractive-index-square-ratio contrast $n_{rc}^2$ of larger than about 0.47 is desirable ($n_{rc}^2$>0.47). Somewhat equivalently, in terms of mode-confinement refractive index difference, to obtain a small spot size of around or smaller than $\lambda/8$, a large mode-confinement refractive index difference $n_{diff}$ of larger than about 4.0 is desirable ($n_{diff}$>4.0).

For 532 nm wavelength of light, dielectric waveguide 202 typically provides a power output of 5 mW-35 mW for an input of 50 mW. This output is much higher when compared with that of conventional fiber-tip-based NSOMs, where, for the same input, the power output is in the range of 10 nW-100 nW.

In addition to pure dielectric core waveguide, a thin slice of metal can also be inserted at the cladding at the end of the NSOM tip to further increase mode focusing. Because of the negative permittivity of the metal, the optical confinement is further increased. This is further explained in conjunction with FIG. 6B.

In an exemplary embodiment of the present invention, the dielectric waveguide core 202 in FIG. 2 is an InGaAsP compound semiconductor with a refractive index of approximately 3.4 with a waveguide core height of about t=300 nm and core width of about b=300 nm, the free space wavelength is λ=1500 nm, the diameter of the optical mode at the tip of waveguide core 202 is about $\lambda/(2\, n_{diff})$ or 220 nm which is about 7 times smaller than the optical wavelength of 1500 nm in vacuum. This optical mode is smaller than the diffraction limit of d=0.61λ by about 3.5 times and hence the tip of waveguide core 202 can be used as a NSOM tip. The length $L_{tip}$ of the tip of waveguide 202 extending beyond the edge of the substrate is about $L_{tip}$=10 micrometers (μm). The waveguide 202 on the substrate is tapered out to a width of about w=8 μm with a taper length of $L_{wb}$=500 μm. The substrate 204 is 100 μm thick InP wafer cut into a width of 50 μm. In one embodiment, the surface of the InP substrate 204 is coated with a low-refractive-index material such as silicon dioxide or Benzocyclobutene (BCB) planarizing polymer on which the waveguide 202 resides to facilitate mode confinement in waveguide 202. As the optical beam propagating in this transparent waveguide core 202 will not experience much optical power loss, it is estimated that about larger than 60% of the light in waveguide 202 will exit the waveguide tip. This enables the tip of waveguide 202 to function as an NSOM tip with very high optical power throughput of close to unity, instead of the low 0.001 ($10^{-1}$%) to 0.000001 ($10^{-4}$%) throughputs of the conventional metal-coated optical fiber based NSOM tips of the prior art. This embodiment is for illustration purpose only and does not limit the scope of the invention in any way.

Figure 3:
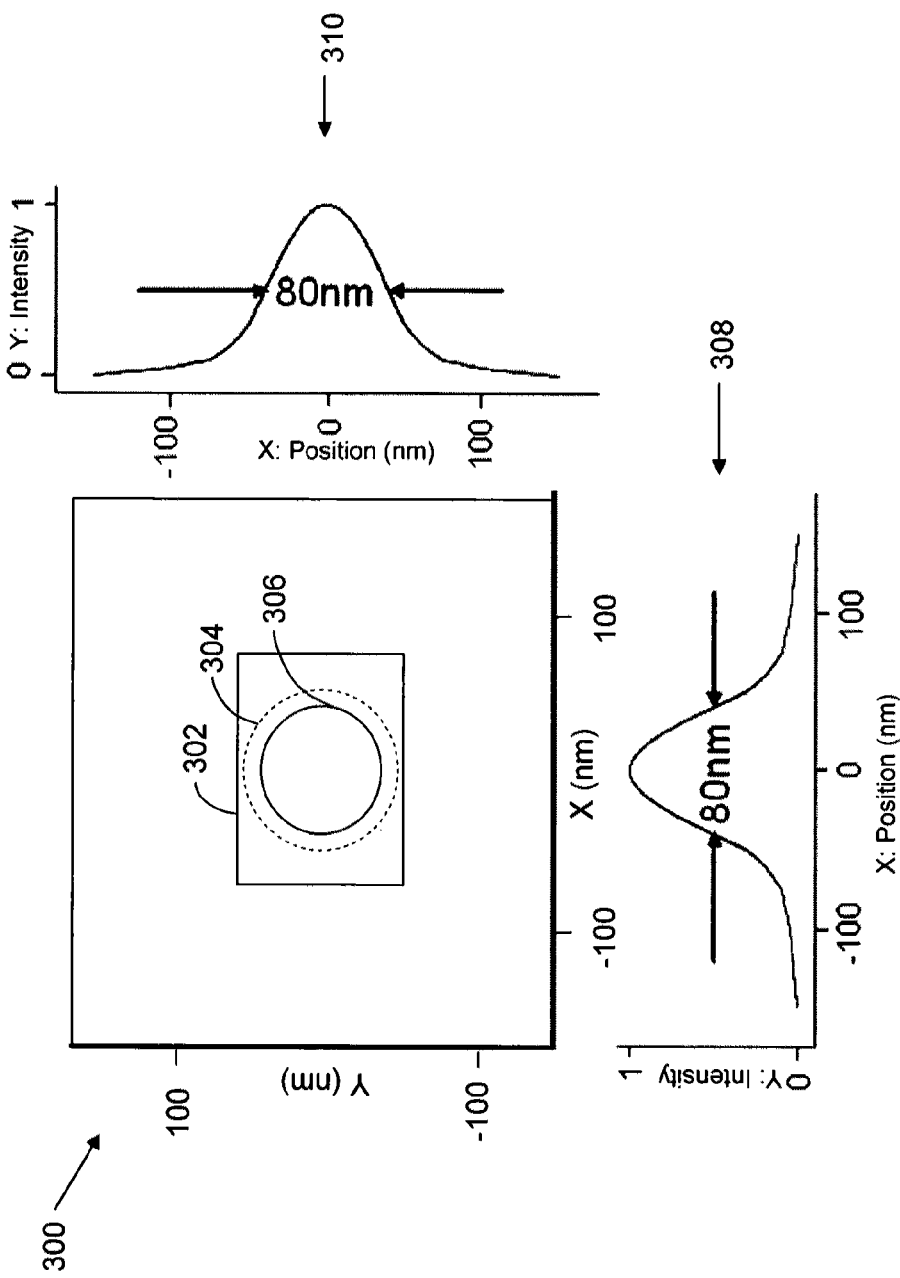
FIG. 3 illustrates a mode profile of an NSOM, in accordance with an embodiment of the invention.

FIG. 3 illustrates the mode profile of NSOM 100, in accordance with an embodiment of the invention. Graph 300 is a simulation graph illustrating the mode profile obtained from dielectric waveguide 202. In an embodiment of the invention, light source 106 with a wavelength of light 630 nm, and dielectric waveguide 202 of thickness 100 mm and breadth 130 mm, and $n_1$=3.5 are used to obtain the simulation. In an exemplary embodiment, dielectric waveguide 202 is made of an InAlGaP compound semiconductor material. In another exemplary embodiment, dielectric waveguide 202 is made of an AlGaN compound semiconductor material. In yet another exemplary embodiment, dielectric waveguide 202 is made up of GaAlP compound semiconductor material. The mode profile obtained from the simulation comprises a rectangular projection 302 corresponding to dielectric waveguide 202, a light circular spot 304, and a bright circular spot 306.

Graphs 308 and 310 depict the position of the spot at Full Width at Half Maximum (FWHM) of the mode intensity. The FWHM of a function is defined as the difference between the two extreme values of a first parameter at which the value of a second parameter is equal to half the maximum value of the first parameter. In graphs 308 and 310, the 'X' axes depict the position of the spot in nm and 'Y' axes the mode intensity.

At the FWHM of mode intensity, bright circular spot 306 is obtained. The mode size of bright circular spot 306 is 80 nm. For λ=630 nm and $n_1$=3.5, the mode size is less than λ/2n. It is possible to obtain a mode size that is less than λ/2 with dielectric waveguide 202. A mode size that is less than the wavelength of light is obtained by using dielectric waveguide 202. Therefore, dielectric waveguide 202 can be used as a sub-wavelength aperture waveguide in optical tip 102.

FIG. 4A illustrates optical tip 102 of NSOM 100, in accordance with an embodiment of the invention. According to an embodiment of the invention, optical tip 102 includes dielectric waveguide 202, light detector 108, light source 106 and substrate 204. In an embodiment of the invention, light detector 108 is not integrated with the rest of the devices. It may be fabricated separately and attached to the tip. Light source 106 can be a laser source such as an optically pumped laser (photonic-wire laser for example) source or an electrically pumped laser source. The photonic-wire laser is also called ring laser and is similar to the disk laser. Optical tip 102 is configured to work in reflection mode imaging.

FIG. 4B illustrates optical tip 102 integrated in a chip, in accordance with another embodiment of the invention. Optical tip 102 comprises dielectric waveguide 202, light detector 108, light source 106, and substrate 204. Light source 106 is an optically pumped or electrically pumped laser source. Dielectric waveguide 202, light detector 108, light source 106, and substrate 204 are integrated to form a single chip. Optical tip 102 is configured to work in reflection mode imaging. Light reflected from sample 110 is collected and detected at the integrated light detector 106 and sample 110 is scanned.

Light source 106 can take many different forms. Some examples are explained in FIG. 7. It will be apparent to a person skilled in the art that the forms of light source 106 shown here are for illustrative purpose only, and they do not limit the scope of the invention in any way.

FIG. 4C illustrates optical tip 102 integrated in a chip, in accordance with yet another embodiment of the invention. Optical tip 102 includes dielectric waveguide 202, light detector 108 and substrate 204. Dielectric waveguide 202, light-detector 108, and substrate 204 are integrated to form a single chip. Optical tip 102b is configured to work in collection mode imaging. Sample 110 is illuminated by using an external source of light, and the light reflected from sample 110 is collected and detected at the light detector 106.

FIG. 4D illustrates an optical tip 102 integrated in a chip, in accordance with another embodiment of the invention. Optical tip 102 includes dielectric waveguide 202, light detector 108, Substrate 204 and a laser 112. Dielectric waveguide 202, light detector 108, substrate 204 and laser source 112 are integrated to form a single chip.

It will be apparent to a person skilled in the art that the FIGS. 4A-4D here is shown for illustrative purpose only. They do not restrict the scope of the invention in any way, and various other ways of arranging the dielectric waveguide 202, light source 106 and light detector 108, and integrating them to form a chip, are possible.

Figure 5B:
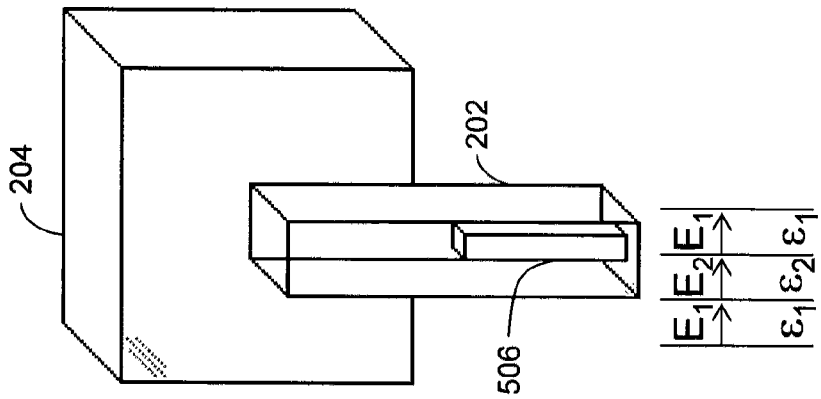
FIG. 5B illustrates a dielectric or metal waveguide to be used in an optical tip of an NSOM, in accordance with another embodiment of the invention.
Figure 5A:
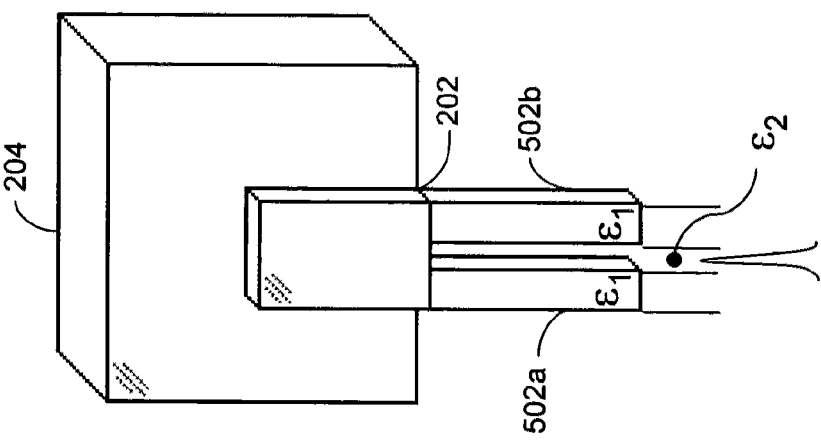
FIG. 5A illustrates a dielectric or metal waveguide to be used in an optical tip of an NSOM, in accordance with an embodiment of the invention.

FIG. 5A illustrates dielectric waveguide 202, for use in optical tip 102 of NSOM 100, in accordance with various embodiments of the invention. In an embodiment of the invention, dielectric waveguide 202 is split into two dielectric cores 502a and 502b, as illustrated in FIG. 5A. Dielectric cores 502a and 502b are separated by air. In this case, when the size of the air gap between cores 502a and 502b is very small, the dielectric cores and the air gap act together as single core. The optical field inside the air gap will be enhanced. In another embodiment, the air gap can be filled with dielectric material as long as its refractive index is lower than the refractive index of the dielectric cores.

According to Maxwell's equation, the electrical permittivity of the dielectric is considered to be $\in_1$ and the electrical permittivity of the air or the dielectric filling material is considered to be $\in_2$. Further, if the direction of the electrical field is perpendicular to the dielectric or air interface, then $$\in_1 E_1 = \in_1 E_2,$$

Where $E_1$ is the field amplitude in the dielectric core, and $E_2$ is the field amplitude in the air. In accordance with the above equation, ratio of the optical intensity in the air ($I_2$) and in the dielectric core can be described as:

$$\frac{I_2}{I_1} = \frac{(\varepsilon_2 E_2^2)}{(\varepsilon_1 E_1^2)} = \frac{\varepsilon_1}{\varepsilon_2} = \frac{(n_1^2)}{(n_2^2)}$$

In case when $n_1 \sim 3$ and $n_2 = 1$, the intensity in the air could be considered to be 9 times stronger as compared to dielectric core. Therefore, a highly localized strong optical field is created, enhancing the optical field inside the air gap.

FIG. 5B illustrates a dielectric waveguide 202 to be used in optical tip 102 of NSOM 100, in accordance with another embodiment of the invention. Dielectric waveguide 202 comprises a dielectric core 204 with a hollow section 506 along its length. The electromagnetic field is concentrated in the hollow section 506. As a result, a better mode confinement is achieved. In another embodiment, the hollow section 506 can be filled with dielectric material as long as its refractive index is lower than the refractive index of the dielectric core 204.

It will be apparent to a person skilled in the art that the embodiments here are shown for illustrative purpose only. They do not restrict the scope of the invention in any way, and various other ways of designing dielectric waveguide 202 for a concentrated electromagnetic field in the core are possible.

In an exemplary embodiment, each dielectric core in FIG. 5A is made up of InGaAsP material with a refractive index of $n_1 = 3.4$. The width of each dielectric core is 100 nm, and the height of each dielectric core is 300 nm. The gap contains air with a refractive index of $n_2 = 1$. The air gap is 100 nm wide and 300 nm high, and the wavelength of light in vacuum used is $\lambda = 1500$ nm. Further, the light has a linear electric field polarization with the polarization vector parallel to the substrate. The intensity enhancement in the air gap is about 10 times higher than the average intensity in the dielectric cores. The effective mode size of the mode at the tip is about 100 nm wide and 300 nm high measured by the full-width half-maximum (FWHM) of the mode intensity profile. This embodiment is for illustration purpose and not limitation.

In another exemplary embodiment, each of the two the dielectric core 202 in FIG. 5B is made up of InGaAsP material with a refractive index of $n_1 = 3.4$. The width of each of the dielectric core is 100 nm. The hollow section is air with a refractive index of $n_2 = 1$. The hollow air section has a diameter of 100 nm, and the wavelength of light in vacuum used is $\lambda = 1500$ nm. Further, the light has a linear electric field polarization with the polarization vector parallel to the substrate. The intensity enhancement in hollow section is about 10 times higher than the average intensity in the dielectric core. The effective mode size of the mode at the tip is about 100 nm wide and 200 nm high measured by the full-width half-maximum (FWHM) of the mode intensity profile. This embodiment is for illustration purpose and not limitation.

Figure 6A:
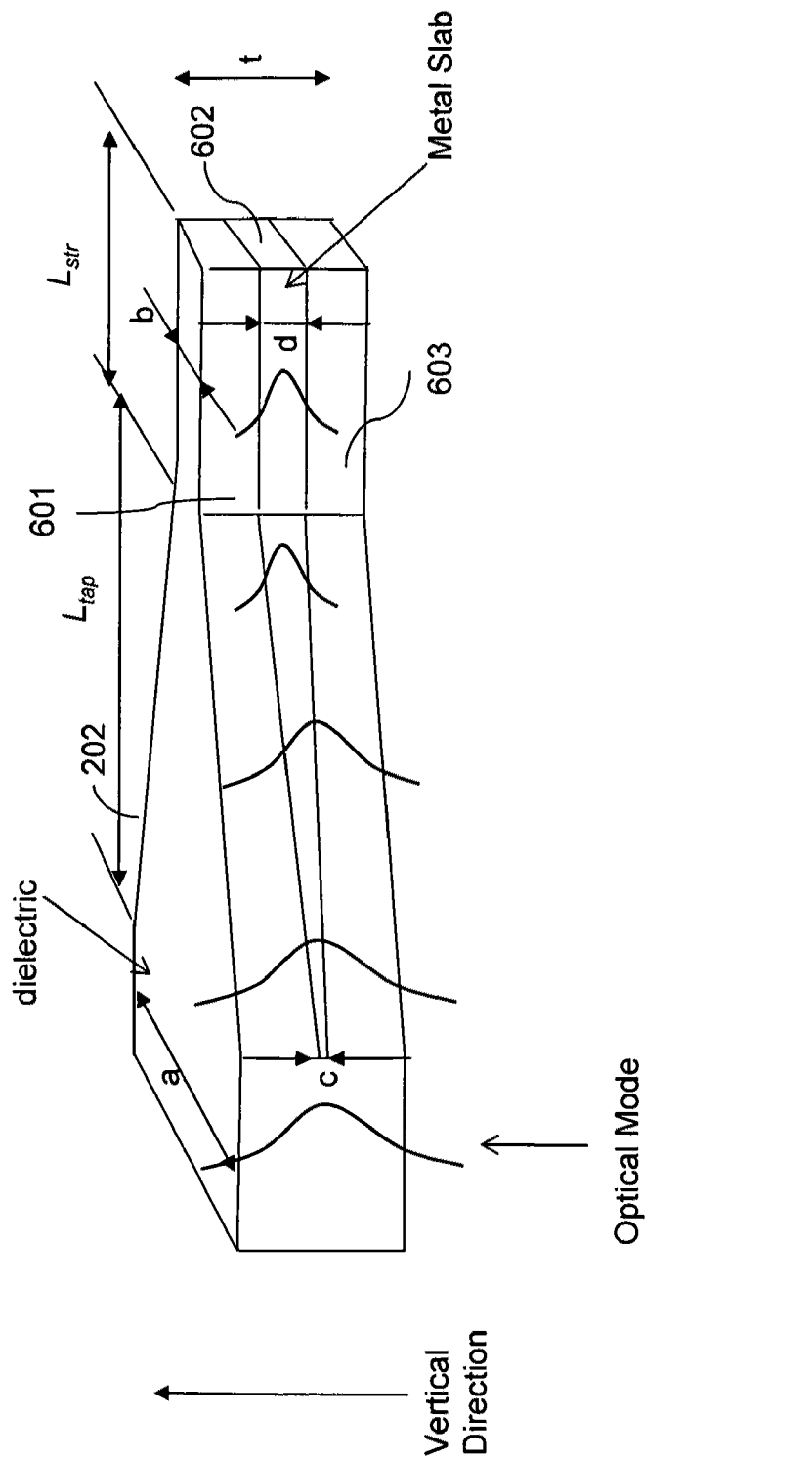
FIG. 6A illustrates a dielectric waveguide with a dielectric-metal structure according to an embodiment of the invention.

FIG. 6A illustrates waveguide 202 with a composite dielectric-metal structure according to another embodiment of the invention. Waveguide 202 has a thickness 't' and a breadth 'b' at the output end. A metal slice 602 is inserted into dielectric waveguide 202 from the end that is used as an optical tip. The metal slice 602 forms the core with an upper dielectric cladding layer material 601 above 602 and a lower dielectric cladding layer material 603 below 602. Waveguide 202 comprising metal core 602 and dielectric cladding layers 601 and 603 then forms a composite dielectric-metal waveguiding structure. In an embodiment of the invention, dielectric cladding layers 601 and 603 are made of semiconductor materials with a high refractive index $n \geq 2$. Because of the negative permittivity of metal slice 602, the optical mode confinement is further increased and concentrated in metal slice 602. In another embodiment of the invention, the metal slice acts as a waveguide core, the vertical size of metal slice 602 increases approximately to $\lambda/(2n_p)$ and the propagating optical wavelength $\lambda_p$ is approximately $\lambda_p = \lambda/(2n_p)$ where $n_p$ is effective propagating refractive index for the dielectric-metal waveguiding structure 202.

Wave propagation in such dielectric-metal structure 202 will have a propagation wave vector $K_p$ given approximately by $$K_p = \left(\frac{2\pi}{\lambda}\right)\sqrt{\frac{\varepsilon_d \varepsilon_m}{\varepsilon_d + \varepsilon_m}}$$

and $K_p$ is approximately related to $\lambda_p$ and $n_p$ as:

$$\mathrm{Re}[K_P] = \left(\frac{2\pi}{\lambda_p}\right) = \left(\frac{2\pi}{\lambda}\right) n_p$$

where $\mathrm{Re}[K_p]$ denotes taking the real part of $K_p$, $\varepsilon_d$ is the dielectric constant (or electric permittivity) of the dielectric cladding layers 601 and 603 around the core metal slice layer 602 and $\varepsilon_m$ is the complex dielectric constant of the metal slice 602 with real part $\varepsilon_{mr}$ and imaginary part $\varepsilon_{mi}$ so that $\varepsilon_m = \varepsilon_{mr} + \varepsilon_{mi}$, where "j" is the square-root of $-1$. It is known to those skilled in the art that the real part of the dielectric constant for metal is negative, so that $\varepsilon_{mr} = -|\varepsilon_{mr}|$ is a negative value. It is also known that at close to the metal plasmon resonance frequency, $\varepsilon_d$ is about equal to $|\varepsilon_{mr}|$ so that the denominator of $K_p$ given by $\varepsilon_d + \varepsilon_m$ becomes close to zero making $K_p$ and hence $n_p$ a vary large value. For example, achieving $n_p > 10$ will be possible. This will enable the vertical mode size at the tip to reduce to below $\lambda/(2n_p) = \lambda/20$, which is over 20 time smaller than the wavelength in vacuum and thus enabling the tip to be used as a NSOM tip. When the metal slice 602 is very thin compared to $\lambda/(2n_p)$, the mode size is large. Hence, the mode size reduction can be achieved with an up-taper for the metal slice 602 by increasing the thickness of the metal slice 602 from a thickness much smaller than $\lambda/(2n_p)$ to a thickness of about $\lambda/(2n_p)$. By making the length of the metal section short, the optical loss can be reduced. This will enable the NSOM tip to have relatively high optical power throughput.

Since the dielectric constant of metal is a complex number, the refractive index of metal $n_m$ is also a complex number so that $n_m = n_{mr} + n_{mi}$, where $n_{mr}$ is the real part of the complex refractive index and $n_{mi}$ is the imaginary part of the complex refractive index. It is related to the dielectric constant by $n_m^2 = \varepsilon_m$. From which, we can derive: $\varepsilon_{mr} = n_{mr}^2 - n_{mi}^2$ and $\varepsilon_{mi} = 2 \times n_{mr} \times n_{mi}$. For metal, the real part of the refractive index $n_{mr}$ is small and the imaginary part of the refractive index $n_{mi}$ is large, making $\varepsilon_{mr}$ to be negative in value. The refractive-index-square-ratio contrast $n_{rc}^2$ involving the real part of the metal refractive index $n_{mr}$ with metal as the core is also large. This is because $n_{mr}$ is typically smaller than 1. That is $$n_{rc}^2 = \frac{n_1^2 - n_2^2}{2n_1^2}$$

has a large value by taking $n_1 = n_{mr}$ to be the real part of the refractive index of the metal waveguide core 602 and $n_2$ being the refractive index of the dielectric waveguide cladding. The refractive index $n_2$ of the dielectric claddings 601 and 603 is related to its dielectric constant $\epsilon_d$ by $\epsilon_d = n_2^2$. In fact, $n_{rc}^2$ is easily larger than 0.3 and is typically larger than 1. For example, gold has a complex refractive index given approximately by $n_m = 0.3 + j\,10$ so that with $n_2 = 1.5$, we can have $n_{rc}^2 = 24$.

The horizontal mode size can also be reduced to approximately $\lambda/(2n_p)$ by laterally down tapering the dielectric-metal structure 202 from a width of approximately $\lambda/(2n_2)$ where $n_2$ is the refractive index of the dielectric claddings 601 and 603, down to a width of approximately $\lambda/(2n_p)$. In one embodiment, the horizontal down taper is provided in the same section as the vertical up taper for the metal strip 602 as illustrated in FIG. 6A.

Figure 6B:
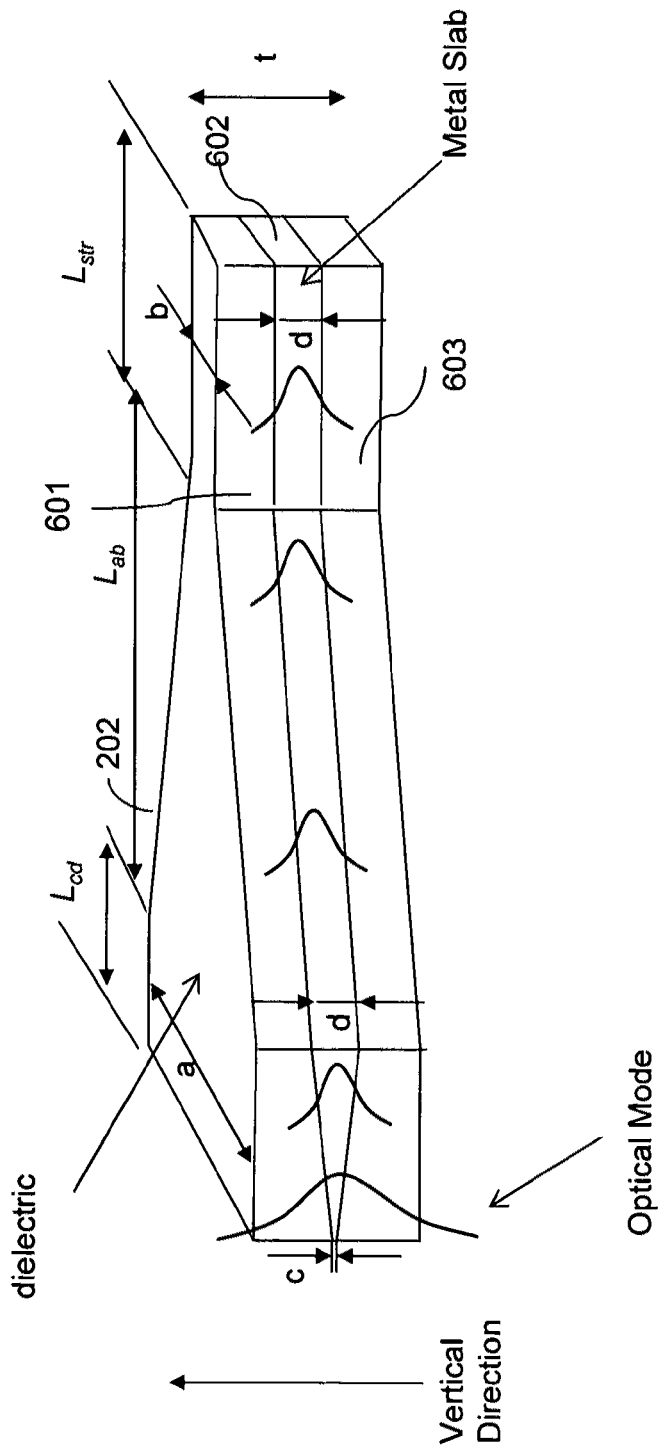
FIG. 6B illustrates a dielectric waveguide with a dielectric-metal structure according to an embodiment of the invention.

In another embodiment, the horizontal down taper is provided in a section (along $L_{cd}$) after the vertical up taper for the metal strip 602 as illustrated in FIG. 6B. In a preferred embodiment, the electric field polarization of the optical mode propagating in waveguide 202 with metal strip 602 is a linear polarization with the electric field vector pointing perpendicular to the surface of the metal strip (i.e. pointing in the vertical direction in FIGS. 6A and 6B). These embodiments are for illustration purpose and not limitation.

In another embodiment, waveguide 202 further has a straight section at the tip with length $L_{str}$ as shown in both FIG. 6A and FIG. 6B. This straight section can help provide a larger working space for the NSOM tip clear from obstruction, but is typically an optional feature. The length of $L_{str}$ will typically range from zero to a few micrometers. These embodiments are for illustration purpose and not limitation.

In yet another embodiment of the invention, the metal slice 602 that forms the waveguide core is gold (Au), silver (Ag), aluminum (Al), nickel (Ni), platinum (Pt), or chromium (Cr).

In another embodiment of the invention, dielectric claddings 601 and 603 are made of a semiconductor material acting as a transparent dielectric material with high refractive index. In another embodiment of the invention, the semiconductor is compound semiconductor, including, but not limited to Indium Phosphide (InP), Gallium Arsenide (GaAs), Indium Gallium Arsenide (InGaAs), Indium Gallium Arsenide Phosphide (InGaAsP), Indium Aluminum Gallium Asenide (InAlGaAs), Aluminum Arsenide (AlAs), Aluminum Gallium Arsenide (AlGaAs), Indium Gallium Aluminum Phosphide (InGaAlP), Indium Gallium Phosphide (InGaP), Gallium Nitride (GaN), Aluminum Nitride (AlN), Gallium Aluminum Nitride (GaAlN), Gallium Phosphide (GaP), Aluminum Phosphide (AlP) with various compositions of the constituent materials. Other examples of the material of the semiconductor waveguide include semiconductors such as AlSb, GaSb, ZnSe, ZnS, CdS, SiC, SiGe, InGaSb, or InSb and their combinations.

In another embodiment of the invention, the semiconductor is a single-element semiconductor including Silicon and Germanium. As is well known to those skilled in the art, these semiconductor materials have high refractive index typically ranging from $n=2$ to $n=4$.

In yet another embodiment of the invention, the dielectric waveguide claddings are oxide, nitride, carbide, boride, or fluoride based material including Titanium Oxide ($TiO_2$), Tantalum pentoxide ($Ta_2O_5$), Zinc Oxide (ZnO), Silicon Oxide ($SiO_2$) Aluminum Oxide ($Al_2O_3$) Indium Oxide ($In_2O_3$,), Yttrium Oxide ($Y_2O_3$), Silicon Nitride ($Si_3N_4$), Zirconium Oxide ($ZrO_2$), Niobium Pentoxide ($Nb_2O_5$), Hafnium Oxide ($HfO_2$), Germanium Oxide ($GeO_2$), Lead Oxide (PbO), Silicon Carbide (SiC), Titanium Carbide (TiC), Titanium Nitride (TiN), Chromium Nitride (CrN), Carbon Nitride (CN), Carbon Boride (CB), Barium Fluoride ($BaF_2$), Magnesium Fluoride ($MgF_2$), Diamond like Carbon (DLC). In another embodiment, the dielectric waveguide is a high-refractive-index polymer or organic material such as Benzocyclobutene (BCB), cyclized transparent optical polymer (CYTOP), and a polymer of imide monomers (Polyimide). As is well known to those skilled in the art, the oxides, nitrides and organic materials have high refractive indices of around $n=1.6$ to $n=2.5$. These embodiments are for illustration purpose and not limitation.

In yet another embodiment, dielectric cladding 601 is of the same dielectric material as cladding 603. In yet another embodiment, dielectric cladding 601 is of a different dielectric material from cladding 603. In as yet another embodiment, dielectric claddings 601 and 603 become very thin or absent at the waveguide tip.

In an exemplary embodiment of the invention, metal slice 602 is made of gold. In another embodiment of the invention, metal slice 602 has an up taper. Wavelength $\lambda$ is approximately equal to 1500 nm whereas $n_p$ is approximately equal to 10. In another embodiment of the invention, the dielectric material used in dielectric cladding layers 601 and 603 is GaAs. GaAs has a refractive index approximately equal to 3.5. Size of the dielectric-metal waveguide 202 at the entrance side is approximately equal to 300 nm in the horizontal direction and 300 nm in the vertical direction. In yet another embodiment of the invention, metal slice 602 is tapered vertically from $c=2$ nm at the input side up to $d=75$ nm at the output side within a length of about $L_{cd}=500$ nm. In yet another embodiment of the invention, dielectric-metal structure 202 is tapered horizontally from $a=300$ nm at the input side down to $b=75$ nm at the output side within a length of about $L_{ab}=500$ nm. In yet another embodiment, the length of the straight section $L_{str}$ is zero. In a preferred embodiment, the vertical taper and horizontal taper are provided in the same section of dielectric-metal structure 202 as shown in FIG. 6A so $L_{ab}=L_{cd}=L_{tap}$. In another embodiment, the horizontal down taper is provided in a section after the vertical up taper for the metal strip 602 as illustrated in FIG. 6B. These embodiments are for illustration purpose and not limitation.

For example, the refractive index of the upper cladding 601 need not be the same as the refractive index of the lower cladding 603. Further, the metal tapering surface with the upper dielectric cladding 601 does not have to have the same tapering slope as the metal tapering surface with the lower dielectric cladding 603. Likewise, the horizontally tapering of structure 202 does not have to be symmetrical on both sides of structure 202.

Figure 6C:
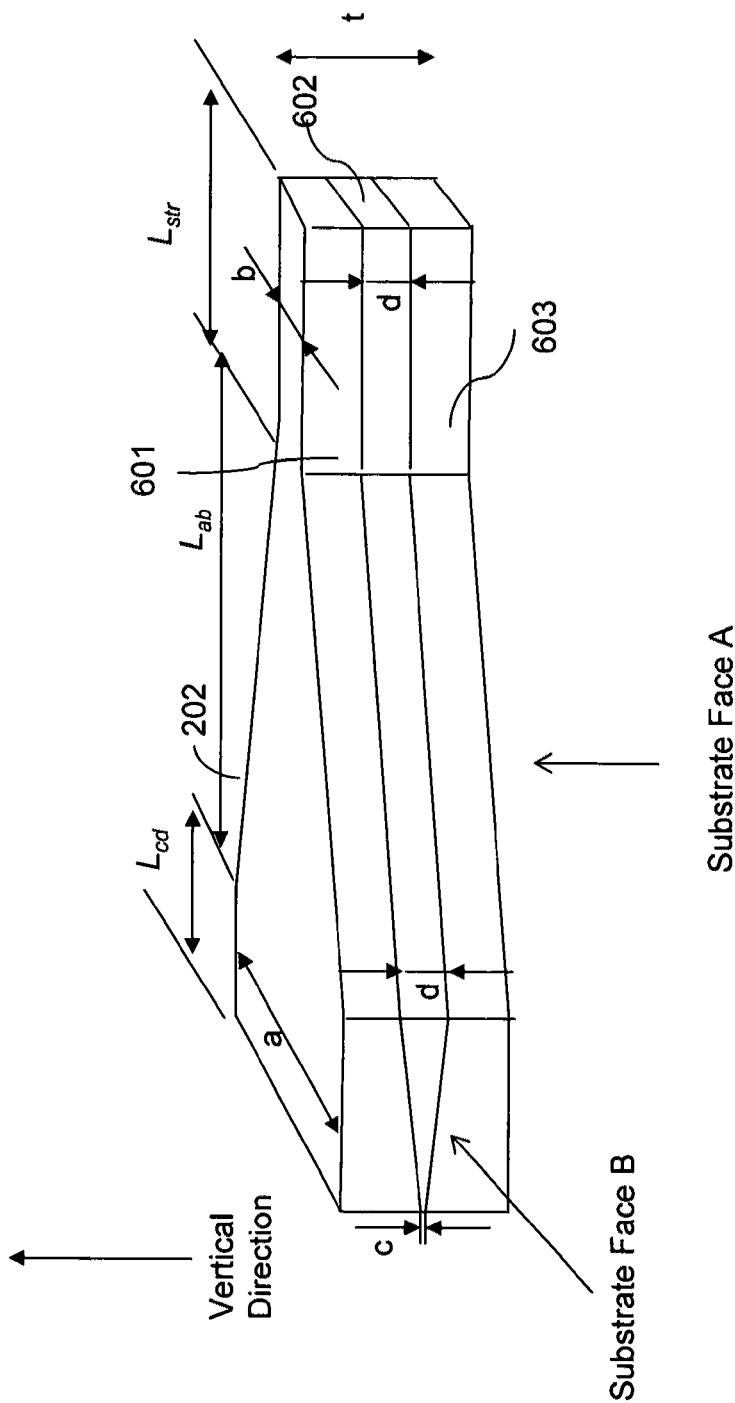
FIG. 6C illustrates a dielectric waveguide with a dielectric-metal structure according to an embodiment of the invention.

In one embodiment, the waveguide 202 is fabricated on a substrate with face A being the planar surface that is placed onto the substrate as shown in FIG. 6C. In one embodiment, the waveguide 202 is fabricated on a substrate with face B being the planar surface that is placed onto the substrate as shown in FIG. 6C, in which case if the substrate is placed horizontally, the structure shown in FIGS. 6A and 6B will be rotated by 90 degrees so that the 'vertical direction' defined in the figures becomes horizontal. These embodiments are for illustration purpose and not limitation.

Figure 7A:
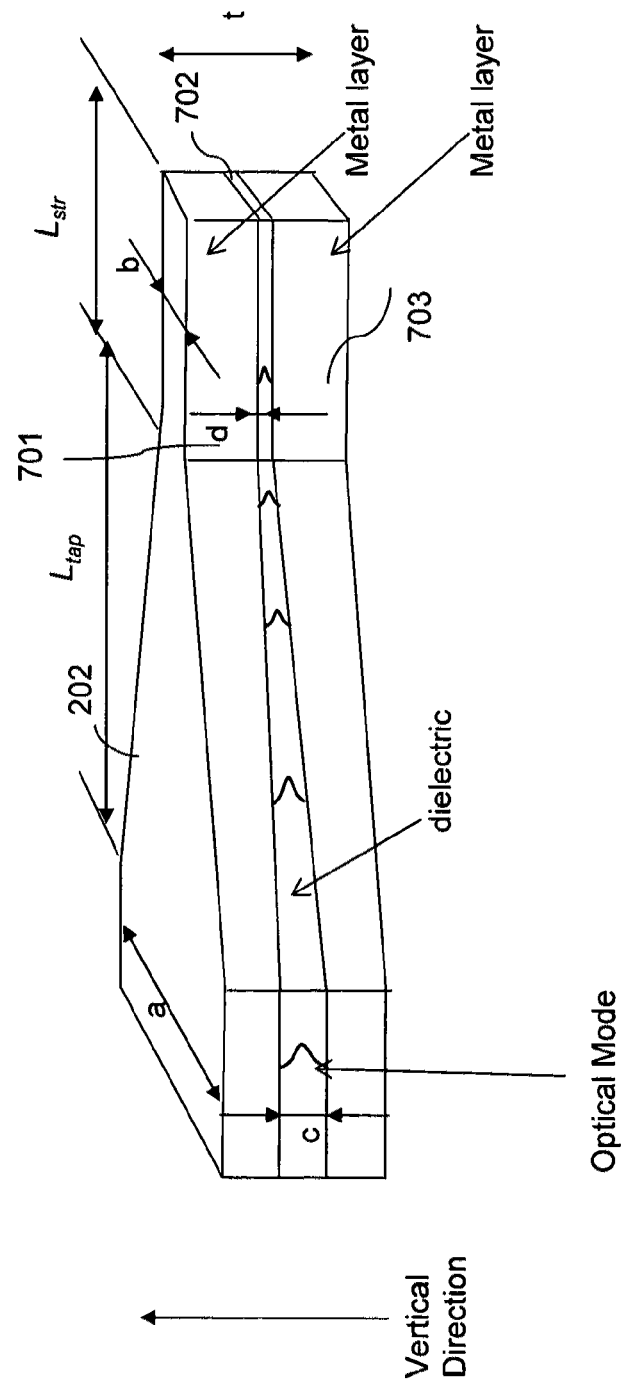
FIG. 7A illustrates a dielectric waveguide with another dielectric-metal structure according to an embodiment of the invention.

FIG. 7A illustrates waveguide 202 with another composite dielectric-metal structure according to another embodiment of the invention. Waveguide 202 has a thickness 't' and a breadth 'b' at the output end. Two metal slices 701 and 703 are inserted into dielectric waveguide 202 from the end that is used as an optical tip. The upper metal slice 701 is placed directly above a dielectric waveguiding core layer 702 and the lower metal slice 703 is placed directly below the dielectric waveguiding core layer 702. Waveguide 202 comprising dielectric core 702 and metal layers 701 and 703 forms a composite dielectric-metal waveguiding structure. Metal layer 701 and 703 may be referred to as the cladding layers of the waveguiding structure 202. In an embodiment of the invention, dielectric core layer 702 is made of semiconductor materials with a high refractive index n>2. Because of the negative permittivity of metal slices 701 and 703, the optical mode confinement is further increased and concentrated in dielectric core layer 702. In another embodiment of the invention, the vertical size of dielectric core layer 702 reduces approximately to $\lambda/(2n_p)$ and the propagating optical wavelength $\lambda_p$ is approximately $\lambda_p=\lambda/(2n_p)$ where $n_p$ is effective propagating refractive index for the dielectric-metal waveguiding structure 202.

Wave propagation in such dielectric-metal structure 202 will have a propagation wave vector $K_p$ given approximately by $$K_p = \left(\frac{2\pi}{\lambda}\right)\sqrt{\frac{\varepsilon_d \varepsilon_m}{\varepsilon_d + \varepsilon_m}}$$

and $K_p$ is approximately related to $\lambda_p$ and $n_p$ as:

$$\mathrm{Re}[K_p] = \left(\frac{2\pi}{\lambda_p}\right) = \left(\frac{2\pi}{\lambda}\right)n_p$$

where $\mathrm{Re}[K_p]$ denote taking the real part of $K_p$, $\varepsilon_d$ is the dielectric constant (or electric permittivity) of the dielectric core 702 and $\varepsilon_m$ is the complex dielectric constant of the metal cladding layers 701 and 702 with real part $\varepsilon_{mr}$ and imaginary part $\varepsilon_{mi}$ so that $\varepsilon_m = \varepsilon_{mr}+j\,\varepsilon_{mi}$, where "j" is the square-root of $-1$. It is known to those skilled in the art that the real part of the dielectric constant for metal is negative so that $\varepsilon_{mr} = -|\varepsilon_{mr}|$ is a negative value. It is also known that at close to the metal plasmon resonance frequency, $\varepsilon_d$ is about equal to $|\varepsilon_{mr}|$ so that the denominator of $K_p$ given by $\varepsilon_d+\varepsilon_m$ becomes close to zero making Kp and hence $n_p$ a vary large value. For example, achieving $n_p>10$ will be possible. This will enable the vertical mode size at the tip to reduce to below $\lambda/(2n_p)=\lambda/20$, which is over 20 times smaller than the wavelength in vacuum and thus enabling the tip to be used as a NSOM tip. When the dielectric core layer 702 is thick compared to $\lambda/(2n_p)$, the mode size is large. Hence, the mode size reduction can be achieved with an down-taper for the dielectric core layer 702 by decreasing the thickness of the dielectric core layer 702 from a thickness much larger than $\lambda/(2n_p)$ to a thickness of about $\lambda/(2n_p)$. Typically at the input end the dielectric core layer thickness is around $\lambda/(2n_1)$, where $n_1$ is the refractive index of the dielectric core layer 702 that is typically smaller than $n_p$. The refractive index $n_1$ of the dielectric core is related to its dielectric constant $\varepsilon_d$ by $\varepsilon_d=n_1^2$. Hence, the thickness of layer 702 will typically be reduced from $\varepsilon/(2n_1)$ down to $\varepsilon/(2n_p)$ via a down taper with a length of L. By making the length L of the down taper section short, the optical loss due to the metal can be reduced. This will enable the NSOM tip to have relatively high optical power throughput.

Similar to the metal core case above, in this metal cladding case, the refractive-index-square-ratio contrast $n_{rc}^2$ involving the real part of the metal refractive index $n_{mr}$ with metal as the cladding is also large. This is because $n_{mr}$ is typically smaller than 1. That is $$n_{rc}^2 = \frac{n_1^2 - n_2^2}{2n_1^2}$$

has a large value by taking $n_2=n_{mr}$ to be the real part of the refractive index of the metal waveguide claddings 701 and 703 and $n_1$ being the refractive index of the dielectric waveguide core 702. In fact, $n_{rc}^2$ is easily larger than 0.3 and is typically larger than 1. For example, gold has a complex refractive index given approximately by $n_m=0.3+j\,10$ so that with $n_2=1.5$, we can have $n_{rc}^2=24$.

Figure 7B:
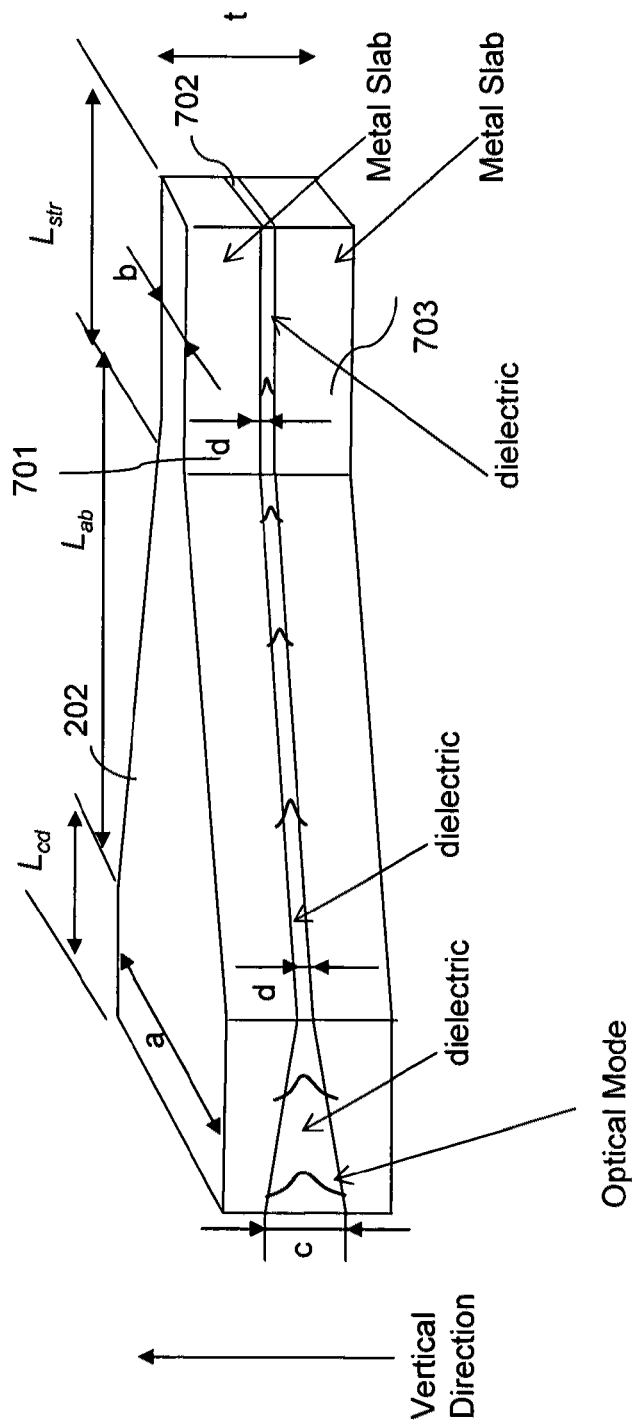
FIG. 7B illustrates a dielectric waveguide with another dielectric-metal structure according to an embodiment of the invention.

The horizontal mode size can also be reduced to approximately $\lambda/(2n_p)$ by laterally down tapering the dielectric-metal structure 202 from a width of approximately $\lambda/(2n_1)$ where $n_1$ is the refractive index of the dielectric core 702 down to a width of approximately $\lambda/(2n_p)$. In one embodiment, the horizontal down taper is provided in the same section as the vertical down taper as illustrated in FIG. 7A. In another embodiment, the horizontal down taper is provided in a section after the vertical down taper as illustrated in FIG. 7B. In a preferred embodiment, the electric field polarization of the optical mode propagating in waveguide 202 with metal cladding layers 701 and 703 is a linear polarization with the electric field vector pointing perpendicular to the surface of the metal layer (i.e. pointing in the vertical direction in FIGS. 7A and 7B). These embodiments are for illustration purpose and not limitation.

In another embodiment of the invention, waveguide 202 further has a straight section at the tip with length $L_{str}$ as shown in both FIG. 7A and FIG. 7B. This straight section can help to provide a larger working space for the NSOM tip clear from obstruction, but is typically an optional feature. The length of $L_{str}$ will typically range from zero to a few micrometers. These embodiments are for illustration purpose and not limitation.

In yet another embodiment of the invention, the metal claddings 701 and 703 that forms the waveguide core is gold (Au), silver (Ag), aluminum (Al), nickel (Ni), platinum (Pt), or chromium (Cr).

In another embodiment of the invention, dielectric core 702 is made of a semiconductor material acting as a transparent dielectric material with high refractive index. In another embodiment of the invention, the semiconductor is compound semiconductor, including, but not limited to Indium Phosphide (InP), Gallium Arsenide (GaAs), Indium Gallium Arsenide (InGaAs), Indium Gallium Arsenide Phosphide (InGaAsP), Indium Aluminum Gallium Arsenide (InAlGaAs), Aluminum Arsenide (AlAs), Aluminum Gallium Arsenide (AlGaAs), Indium Gallium Aluminum Phosphide (InGaAlP), Indium Gallium Phosphide (InGaP), Gallium Nitride (GaN), Aluminum Nitride (AlN), Gallium Aluminum Nitride (GaAlN), Gallium Phosphide (GaP), Aluminum Phosphide (AlP) with various compositions of the constituent materials. Other examples of the material of the semiconductor waveguide include semiconductors such as AlSb, GaSb, ZnSe, ZnS, CdS, SiC, SiGe, InGaSb, or InSb and their combinations.

In another embodiment of the invention, the semiconductor is a single-element semiconductor including Silicon and Germanium, As is well known to those skilled in the art, these semiconductor materials have high refractive index typically ranging from n=2 to n=4.

In yet another embodiment of the invention, the dielectric core 702 is oxide, nitride, carbide, boride, or fluoride based material including Titanium Oxide ($TiO_2$), Tantalum pentoxide ($Ta_2O_5$), Zinc Oxide (ZnO), Silicon Oxide ($SiO_2$) Aluminum Oxide ($Al_2O_3$) Indium Oxide ($In_2O_3$,), Yttrium Oxide ($Y_2O_3$), Silicon Nitride ($Si_2N_3$), Zirconium Oxide ($ZrO_2$), Niobium Pentoxide ($Nb_2O_5$), Hafnium Oxide ($HfO_2$), Germanium Oxide ($GeO_2$), Lead Oxide (PbO), Silicon Carbide (SiC), Titanium Carbide (TiC), Titanium Nitride (TiN), Chromium Nitride (CrN), Carbon Nitride (CN), Carbon Boride (CB), Barium Fluoride ($BaF_2$), Magnesium Fluoride ($MgF_2$), Diamond like Carbon (DLC). In another embodiment, the dielectric waveguide is a high-refractive-index polymer or organic material such as Benzocyclobutene (BCB), cyclized transparent optical polymer (CYTOP), and a polymer of imide monomers (Polyimide). As is well known to those skilled in the art, the oxides. nitrides and organic materials have high refractive indices of around n=1.6 to n=2.5. These embodiments are for illustration purpose and not limitation.

In as yet another embodiment, metal cladding 701 is of the same metallic material as metal cladding 703. In as yet another embodiment, metal cladding 701 is of a different metallic material from metal cladding 703.

In an exemplary embodiment of the invention, metal cladding layers 701 and 703 are made of gold. In another embodiment of the invention, the dielectric core layer 702 has an up taper. Wavelength $\lambda$ is approximately equal to 1500 nm whereas $n_p$ is approximately equal to 10. In another embodiment of the invention, the dielectric material used in dielectric core layer 702 is GaAs. GaAs has a refractive index approximately equal to 3.5. Size of the dielectric-metal waveguide 202 at the entrance side is approximately equal to 300 nm in the horizontal direction and 300 nm in the vertical direction. In yet another embodiment of the invention, dielectric core layer 702 is tapered vertically from c=300 nm at the input side down to d=75 nm at the output side within a length of about $L_{cd}$=500 nm. In yet another embodiment of the invention, dielectric-metal structure 202 is tapered horizontally from a=300 nm at the input side down to b=75 nm at the output side within a length of about $L_{ab}$=500 nm. In yet another embodiment, the length of the straight section $L_{str}$ is zero. In a preferred embodiment, the vertical taper and horizontal taper are provided in the same section of dielectric-metal structure 202 as shown in FIG. 7A so $L_{ab}$=$L_{cd}$=$L_{tap}$. In another embodiment, the horizontal down taper is provided in a section after the vertical up taper for the dielectric core 702 as illustrated in FIG. 7B. These embodiments are for illustration purpose and not limitation.

For example, the dielectric constant the upper metal cladding later 701 need not be the same as the dielectric constant of the lower metal cladding layer 703, the upper tapering surface of the dielectric core 702 with metal cladding 701 does not have to have the same tapering slope as the lower tapering surface of the dielectric core 702 with metal cladding 703. Likewise, the horizontally tapering of structure 202 does not have to be symmetrical on both sides of structure 202.

Figure 7C:
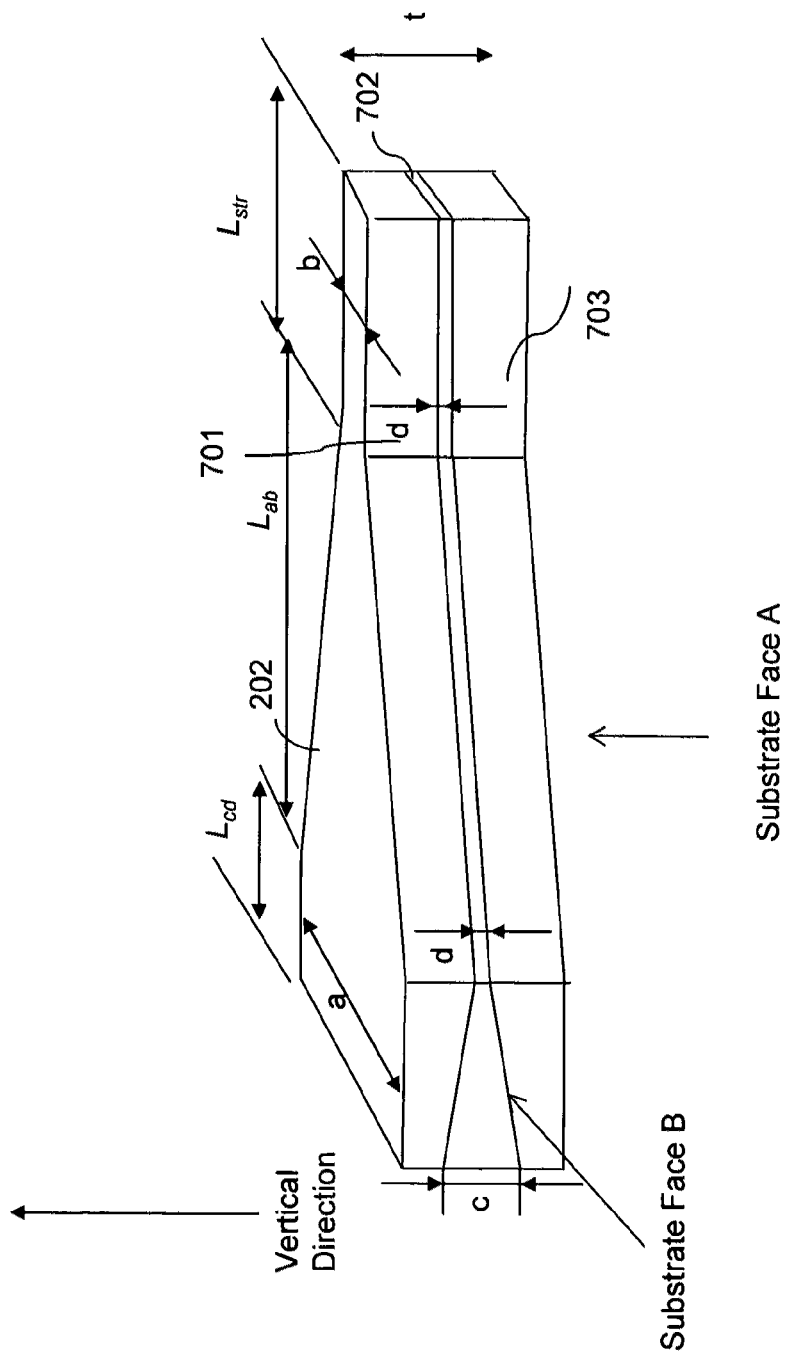
FIG. 7C illustrates a dielectric waveguide with another dielectric-metal structure according to an embodiment of the invention.

In one embodiment, the waveguide 202 is fabricated on a substrate with face A being the planar surface that is placed onto the substrate as shown in FIG. 7C. In one embodiment, the waveguide 202 is fabricated on a substrate with face B being the planar surface that is placed onto the substrate as shown in FIG. 7C, in which case if the substrate is placed horizontally, the structure shown in FIGS. 7A and 7B will be rotated by 90 degrees so that the 'vertical direction' defined in the figures becomes horizontal. These embodiments are for illustration purpose and not limitation.

Figure 8A:
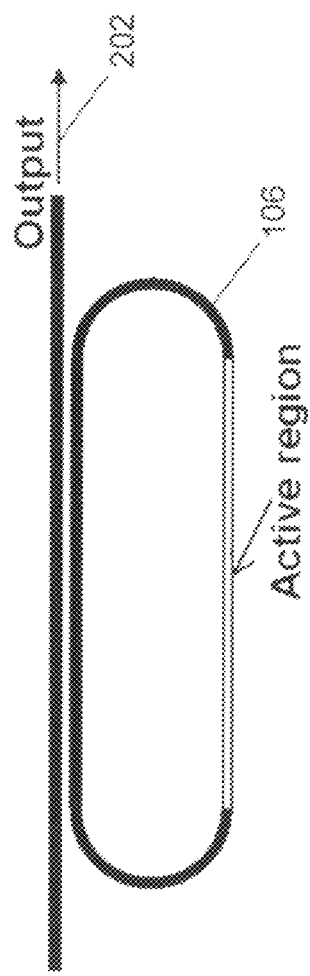
FIG. 8A-8B illustrate a micro-laser with an NSOM tip, in accordance with an embodiment of the invention.
Figure 8B:
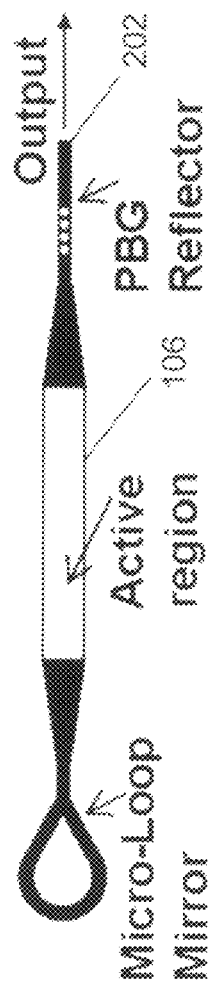

FIGS. 8A and 8B illustrate a micro-laser with an NSOM tip, in accordance with various embodiments of the invention. Micro-lasers are lasers based on guiding sub-micrometer wide structures. Common examples of such micro-lasers include photonic-wire lasers, ring lasers, disk lasers, mirror-ing lasers, micro disk lasers, race-track lasers, micro loop-mirror laser, and photonic band gap lasers. These lasers are well known to those skilled in the art. A micro-laser includes a micro-loop mirror, an active region and a Photonic Band Gap (PBG) Reflector at the output.

A Photonic Band Gap Reflector is used, since a photonic crystal with a three-dimensional photonic band gap and a single point defect can provide high-Q micro cavities of a specific volume, which support only one mode within the gain bandwidth of the lasing medium. The resulting efficient low-threshold lasers can be packed in large numbers onto a single substrate.

Photonic crystals or PBG structures are used to provide efficient, low noise light emitters. The PBG structures having periodical spatial variation of refractive index may exhibit a band of frequencies. The electromagnetic wave propagation within this band of frequencies is forbidden. The band is called a PBG by analogy with an electronic gap in semiconductor crystals.

Micro-loop mirrors (MLM) are used to provide high reflectivity. An MLM has a Y-splitter which has two arms as shown in FIG. 8B. Connecting the two arms of the Y-splitter with a single-mode waveguide provides a high reflectivity MLM. The gain section can be enlarged in order to increase the power output.

FIG. 9 illustrates various NWT/NWTD-NSOM chips, fabricated in accordance with various embodiments of the invention. In accordance with an embodiment of the invention, an epitaxial-grown quantum well wafer containing an InP substrate is used, as illustrated in FIG. 9A. The term epitaxy refers to a method of depositing a monocrystalline film on a monocrystalline substrate. The deposited film is referred to as an epitaxial film or epitaxial layer. The epitaxial film takes on a lattice structure and orientation identical to those of the substrate.

A quantum well is a potential well that restricts particles—that are originally free to move in three dimensions to two dimensions, forcing them to occupy a planar region. Quantum wells are formed in semiconductors. A semiconductor material, such as Gallium Arsenide (GaAs) is sandwiched between two layers of another material like Aluminum Gallium Arsenide (AlGaAs) with a wide bandgap in between. These structures can be grown by molecular beam epitaxy on GaAs substrate. Alternatively, for operation at 1550 nm wavelength, a semiconductor material, such as InGaAs is sandwiched between two layers of another material like InGaAsP with a wide bandgap in between. These structures can be grown by metal organic chemical vapor deposition (MOCVD) on InP substrate.

Figure 9A:
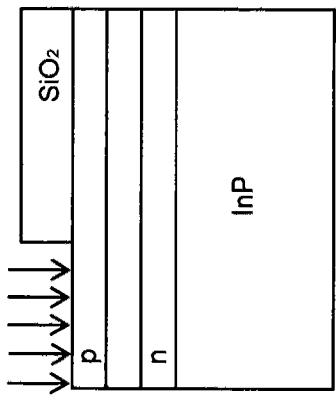
FIG. 9A-9H illustrate various NWTL/NWTD-NSOM chips, fabricated in accordance with various embodiments of the invention.
Figure 9B:
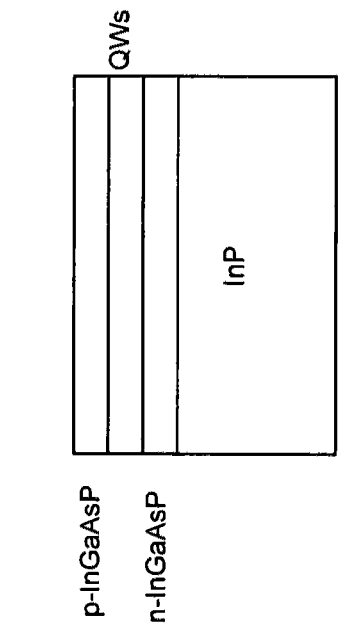
Figure 9C:
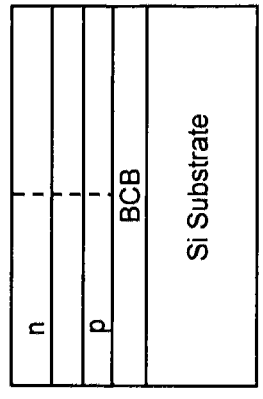

The second step, as illustrated in FIG. 9B includes implantation of a portion of the wafer. The ion implanted portion can be made passive later in the procedure. FIG. 9C illustrates the portion that is made passive. Further, the wafer is annealed to induce quantum well intermixing. The band gap in the implanted portion is shifted to transparency for the operation wavelength. In the case of InGaAs, the ion implanted is phosphorus. The implantation is performed with 300 KeV ion implator.

Figure 9D:

As illustrated in FIG. 9D, the wafer is further bonded to a carrier wafer using Benzocyclobutene (BCB). In the case of the InGaAs/InGaAsP or the GaAs/AlGaAs structures, the carrier wafer is InP. BCB is a benzene ring fused to a cyclobutane ring. It has chemical formula $C_8H_8$. BCB-based polymer dielectrics may be applied to various substrates. Applications of BCB include wafer bonding, optical interconnects, low-K dielectrics, and intracortical neural implants.

Further, the original InP or GaAs substrate is removed by the process of carrier substrate protection, lapping and wet-etching. This process results in a thin layer of the InGaAs/InGaAsP structure or GaAs/AlGaAs structure bonded to an InP substrate. The carrier substrate is protected by Wax. In the case of InP substrate, the wet etchant used is hydrochloric acid (HCL). A waveguide tip and various other device pattern such as a laser pattern is formed on the wafer by the process of lithography. FIG. 9E illustrates the formation of ridge after the process of wet etching. The pattern is further transferred to a $SiO_2$ mask first and then transferred into a semiconductor layer. The waveguide tip has a portion extending all the way to one edge of the carrier wafer substrate, which now becomes the new substrate on which the waveguide resides.

Figure 9F:
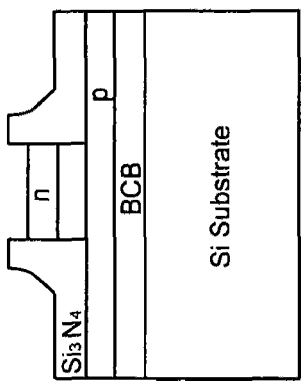
Figure 9E:
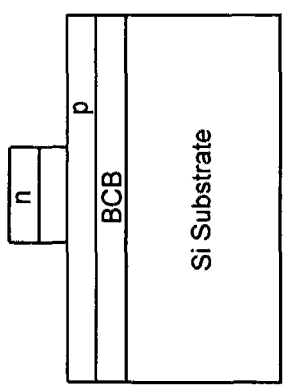

As illustrated in FIG. 9F, the wafer is made passive by using silicon nitride. The process is referred to as passivation. Further, a contact window is opened on top of the laser ridge. After the formation of the contact window, Transparent Conducting Oxide (TCO) contact is formed. This is followed by an n-metal contact. The formation of n-metal contact is illustrated in conjunction with FIG. 9G.

Figure 9H:
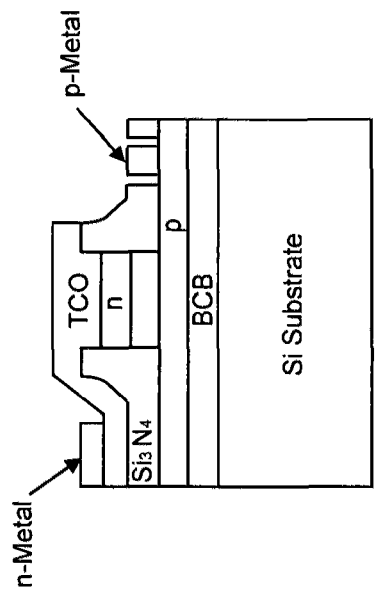
Figure 9G:
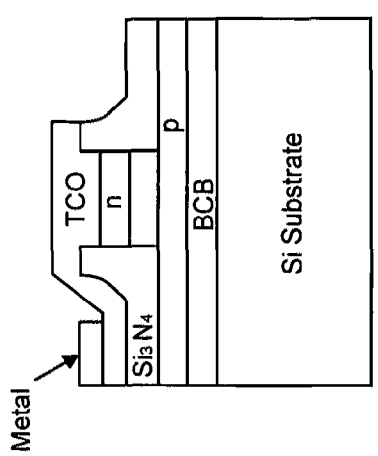

Further, a p-contact window is opened on the wafer. The p metal contact formed is moved aside by conducting through the semiconductor layer. The wafer formed is shown in FIG. 9H. The wafer so formed undergoes a process of cleaving.

Finally, the cleaved wafer goes through 'controlled selective wet or dry etching' process. A portion of the carrier wafer from the edge of the wafer gets etched away and a nano-waveguide NSOM tip is thus formed. In the case of InP carrier substrate, the selective etchant is hydrochloric acid (HCL) to remove the InP substrate from the edge without etching the InGaAs/InGaAsP waveguide or GaAs/AlGaAs waveguide much. A subsequent oxygen dry etching from the edge helps in removing the BCB polymeric materials around the waveguide without etching the waveguide much.

The above fabricating processes are meant for illustration purposes only and not limitation. The process of fabricating the waveguide optical tip is essentially made up of the following main steps:

Step 1: The usual processes of fabricating an optical waveguide involving lithography and etching or wafer bonding and back etching is used to fabricate the waveguide 202 on a substrate with a portion of the waveguide extending to near the edge of the substrate. As is well known to those skilled in the art, there are many methods of fabricating a waveguide on a substrate, including but not limited to the use of lithography, for example, photolithography, ebeam lithography, and nano-imprinting lithography, and the use of etching, for example, wet chemical etching or dry etching by using Reactive ion-beam etching, (RIE) inductively-coupled plasma (ICP) etching etc. In some cases as is illustrated above, wafer bonding and back etching is used to transfer the device structure to another new final substrate.

Step 2: The utilization of a waveguide material that will be etched in a wet chemical or a dry etching process at a slower rate than the final substrate. In the above illustration, the waveguide material is InGaAsP, the final substrate is InP, and the chemical HCL is used to selectively etch away the InP substrate without etching the InGaAs/InGaAsP waveguide much. A dry process involving oxygen plasma is used to selectively etch away the BCB polymeric material around the waveguide without etching the InGaAs/InGaAsP waveguide much.

(a) The removal of the substrate material from its edge without removing the waveguide by selectively etching the substrate by using the said selective chemical or the said selective dry etching process or both the said selective chemical and the said selective dry etching process.

(b) The said selective chemical or the said selective dry etching process etches away the final substrate leaving a portion of the waveguide over hung from the new edge of the substrate.

The processes in fabricating the said waveguide can be used to jointly fabricate other integrated photonic components including laser and/or light detector.

Various embodiments of the invention provide an optical tip of an NSOM that minimizes energy loss inside the probe. Further, by using a semiconductor as the material, the optical tip provides a high energy throughput for near-field scanning operations, while localized heating at the probe is low. In addition, the optical tip enables the NSOM to achieve faster scanning speeds. Moreover, the optical tip is easily mass-producible, requires minimum inspection during manufacturing, and is low in cost.

Various applications of NSOM 100 with optical tip 102 include nano-manufacturing, laser machining at micrometer and nanometer scales, nano-object manipulation, laser tweezers, nano-chemistry, nano-sample analysis, ultra-high capacity optical data storage, medical and pharmaceutical uses such as nano-medicine research, stimulated heating of localized sections, cutting of medical tissues, etc. It will be apparent to a person skilled in the art that various other applications in the fields of electrical, mechanical, environmental, biological, chemical, medical and physical sciences are possible.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. An optical tip of a Near-field Scanning Optical Microscope (NSOM) comprising:
   a waveguide comprising a core and a cladding, wherein the refractive-index-square-ratio contrast between the core and the cladding is at least 0.3.

2. The optical tip according to claim 1 wherein the waveguide is disposed on a substrate with an output end of the waveguide extending outside an edge of the substrate.

3. The optical tip according to claim 1, wherein the core is made of one of a semiconductor, a compound semiconductor, a dielectric, a metal, a nitride, a carbide, a boride, a fluoride, an oxide and a polymer.

4. The optical tip according to claim 1, wherein the cladding is made of one a metal, a dielectric, a semiconductor and air.

5. The optical tip according to claim 1, wherein the cladding and the core are tapered towards the output end of the waveguide.

6. The optical tip according to claim 1, wherein the cladding and the core are tapered in the same direction.

7. The optical tip according to claim 1, wherein the cladding and the core are tapered in opposite directions.

8. The optical tip according to claim 1, wherein the core is made of a dielectric material with a refractive index $n_1$, the cladding is made of a dielectric material with a refractive index $n_2$, and the core at the output end of the waveguide has a vertical dimension and a horizontal dimension equal to $\lambda/[2(n_1^2-n_2^2)^{0.5}]$, where $\lambda$ is a wavelength in free space for a light beam in the waveguide.

9. The optical tip according to claim 1, wherein the cladding is made of a dielectric material with dielectric constant $\in_d$, the core is made of a metallic material with complex dielectric constant $\in_m$ with real part $\in_{mr}$ and imaginary part $\in_{mi}$; so that $\in_m=\in_{mr}+j\in_{mi}$, where "j" is the square-root of $-1$.

10. The optical tip according to claim 9, wherein a propagation wave vector $K_p$ for the optical tip is given by $$K_p = \left(\frac{2\pi}{\lambda}\right)\sqrt{\frac{\varepsilon_d \varepsilon_m}{\varepsilon_d + \varepsilon_m}}$$

and $K_p$ is approximately related to $\lambda_p$ and $n_p$ as:

$$\text{Re}[K_p] = \left(\frac{2\pi}{\lambda_p}\right) = \left(\frac{2\pi}{\lambda}\right)n_p$$

where $\text{Re}[K_p]$ denotes the real part of $K_p$.

11. The optical tip according to claim 9, wherein the core has a vertical dimension and a horizontal dimension equal to $\lambda/(2 n_p)$, where $\lambda$ is a wavelength in free space for a light beam in the waveguide.

12. The optical tip according to claim 1 further comprising:
 a. a light-detector attached to the waveguide; and
 b. a light-source, wherein the light source directs a beam of light through the waveguide.

13. The optical tip according to claim 1, wherein the light-source is a laser source.

14. The optical tip according to claim 13, wherein the waveguide, the light-detector, and the light-source are monolithically integrated to form a chip.

15. The optical tip according to claim 13, wherein the laser is one of an electrically pumped laser, an optically pumped laser, a photonic-wire laser, a ring laser, a disk laser, a micro-ring laser, a micro-disk lasers, a race-track laser, a photonic-bandgap laser, and a micro loop mirror laser.

16. The optical tip according to claim 1, wherein the core comprises a hollow section along the length of the core.

17. The optical tip according to claim 1, wherein the core comprises an integrated thin slice of metal.

18. The optical tip according to claim 1, wherein the waveguide is split into two cores, wherein the cores are separated by a thin gap of air.

19. The optical tip according to claim 1, wherein the core is made from one or more of the semiconductors from a group of semiconductors including:
 InP, GaAs, InGaAs, InGaAsP, InAlGaAs, AlAs, AlGaAs, InGaAlP, InGaP, GaN, AlN, GaAlN, GaP, AlP, AlSb, GaSb, ZnSe, ZnS, CdS, SiC, SiGe, InGaSb, InSb, Si, and Ge.

20. The optical tip according to claim 1, wherein the core is made from one or more of materials from a group of oxide, nitride, carbide, boride, or fluoride based materials including:
 TiO2, Ta2O5, ZnO, SiO2, Al2O3, In2O3, Y2O3, Si2N3, ZrO2, Nb2O5, HfO2, GeO2, PbO, SiC, TiC, TiN, CrN, CN, CB, BaF2, MgF2, DLC (Diamond-Like Carbon).

21. The optical tip according to claim 1, wherein the core is made of one of gold (Au), silver (Ag), aluminum (Al), nickel (Ni), platinum (Pt), and chromium (Cr).

22. The optical tip according to claim 1, wherein the cladding is made from one of gold (Au), silver (Ag), aluminum (Al), nickel (Ni), platinum (Pt), and chromium (Cr).

23. The optical tip according to claim 1, wherein the core is made from one or more of the materials from a group of polymeric materials including:
 Benzocyclobutene (BCB), Cyclized Transparent Optical Polymer (CYTOP), and a polymer of imide monomers (Polyimide).

* * * * *